(12) United States Patent
Hong

(10) Patent No.: US 11,949,574 B2
(45) Date of Patent: Apr. 2, 2024

(54) DATA PROCESSING METHOD AND APPARATUS, ELECTRONIC DEVICE AND COMPUTER-READABLE STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 17/637,054

(22) PCT Filed: Aug. 19, 2019

(86) PCT No.: PCT/CN2019/101317
§ 371 (c)(1),
(2) Date: Feb. 21, 2022

(87) PCT Pub. No.: WO2021/031064
PCT Pub. Date: Feb. 25, 2021

(65) Prior Publication Data
US 2022/0303202 A1 Sep. 22, 2022

(51) Int. Cl.
*H04L 43/0852* (2022.01)
*H04L 43/16* (2022.01)
*H04L 47/78* (2022.01)
*H04L 49/253* (2022.01)

(52) U.S. Cl.
CPC .......... *H04L 43/0852* (2013.01); *H04L 43/16* (2013.01); *H04L 47/781* (2013.01); *H04L 49/254* (2013.01)

(58) Field of Classification Search
CPC ........................... H04L 47/805; H04L 49/254
See application file for complete search history.

(56) References Cited

U.S. PATENT DOCUMENTS 5,174,472 A * 12/1992 Raque .................. F04B 7/0007
417/18
5,381,408 A *  1/1995 Brent .................... H04J 3/0632
370/517
(Continued)

FOREIGN PATENT DOCUMENTS

CN          101483883 A       7/2009
CN          101557551 A      10/2009
(Continued)

OTHER PUBLICATIONS

International Search Report of PCT/CN2019/101317 dated May 21, 2020 with English translation, (4p).

*Primary Examiner* — Barbara B Anyan
(74) *Attorney, Agent, or Firm* — Arch & Lake LLP

(57) ABSTRACT

A data processing method is provided. The method incudes that: determining whether a relationship between a processing delay correlation value of data to be processed when processed by a network side device and a preset threshold value satisfies a preset relationship or not; and in response to determining that the relationship between the processing delay correlation value and the preset threshold value satisfies the preset relationship, sending the data to be processed to the network side device for processing.

19 Claims, 14 Drawing Sheets

Determine whether a relationship between a processing delay correlation value of data to be processed when processed by a network side device and a preset threshold value satisfies a preset relationship or not  — S1

Send, if the relationship between the processing delay correlation value and the preset threshold value satisfies the preset relationship, the data to be processed to the network side device for processing  — S2

(56) References Cited

U.S. PATENT DOCUMENTS

| | | | | |
|---|---|---|---|---|
| 5,513,174 | A | * | 4/1996 | Punj ..................... H04L 49/254 370/428 |
| 6,539,026 | B1 | * | 3/2003 | Waclawsky ........... H04L 47/781 370/428 |
| 2007/0081372 | A1 | * | 4/2007 | Xiong Zeng ....... H02M 7/5387 363/132 |
| 2007/0091815 | A1 | * | 4/2007 | Tinnakornsrisuphap .................... H04N 21/2402 370/252 |
| 2014/0288766 | A1 | * | 9/2014 | Chakravarty ...... G05B 23/0235 701/32.4 |
| 2015/0382207 | A1 | * | 12/2015 | Dimou ................. H04W 92/10 370/280 |
| 2017/0069207 | A1 | * | 3/2017 | Ma .................. G08G 1/096791 |
| 2022/0291359 | A1 | * | 9/2022 | Tziony ................. G01S 7/4815 |

FOREIGN PATENT DOCUMENTS

| | | | |
|---|---|---|---|
| CN | 103533002 | A | 1/2014 |
| CN | 106302434 | A | 1/2017 |
| CN | 107222403 | A | 9/2017 |
| CN | 107911407 | A | 4/2018 |
| WO | 2016070651 | A1 | 5/2016 |
| WO | WO-2017049925 | A1 * | 3/2017 |

\* cited by examiner

DATA PROCESSING METHOD AND APPARATUS, ELECTRONIC DEVICE AND COMPUTER-READABLE STORAGE MEDIUM

CROSS REFERENCE TO RELATED APPLICATION

The present application is the U.S. National Phase Application of International Patent Application Serial No. PCT/CN2019/101317 filed on Aug. 19, 2019. The entire contents of the above-cited application are hereby incorporated by reference in their entireties for all purposes.

BACKGROUND

At present, in a process that a terminal communicates with a network side device, when data needs to be processed, it is all done by the terminal itself, and the network side device plays a role in configuring resources for the terminal.

However, with the development of science and technology, various types of data experience an explosive growth, so a data size of data that needs to be processed by the terminal is greatly increased. Under a condition that a processing ability of the terminal is not improved, a delay of processing the data will be relatively high, thus failing to meet needs of a user.

SUMMARY

The disclosure relates to the technical field of communication, in particular to a data processing method, an electronic device and a non-transitory computer-readable storage medium.

According to a first aspect of the disclosure, a data processing method is provided, and is applicable to a terminal. The method includes:
  determining whether a relationship between a processing delay correlation value of data to be processed when processed by a network side device and a preset threshold value satisfies a preset relationship or not; and
  sending, in response to determining that the relationship between the processing delay correlation value and the preset threshold value satisfies the preset relationship, the data to be processed to the network side device for processing.

According to a second aspect of the disclosure, a data processing method is provided, and is applicable to a network side device. The method includes:
  receiving, by a network side device, a data size of data to be processed, a preset threshold value and a request for determining whether a relationship between a processing delay correlation value and the preset threshold value satisfies a preset relationship or not sent by a terminal;
  determining, by the network side device, whether the relationship between the processing delay correlation value and the preset threshold satisfies the preset relationship or not;
  sending, by the network side device, feedback information to the terminal, wherein the feedback information indicates whether the relationship between the processing delay correlation value and the preset threshold satisfies the preset relationship or not;
  receiving, by the network side device, the data to be processed sent by the terminal;
  processing, by the network side device, the data to be processed; and
  sending, by the network side device, processed data to the terminal.

According to a third aspect of the disclosure, an electronic device is provided, and includes:
  a processor; and
  a memory used for storing an instruction executable by the processor.

The processor is configured to realize the data processing method applicable to a terminal according to the first aspect.

According to a fourth aspect of the disclosure, an electronic device is provided, and includes:
  a processor; and
  a memory used for storing an instruction executable by the processor.

The processor is configured to realize the data processing method applicable to a network side device according to the second aspect.

According to a fifth aspect of the disclosure, a non-transitory computer-readable storage medium is provided, and stores a computer program on it. The program, when being executed by a processor, realizes steps in the data processing method applicable to a terminal according to the first aspect.

According to a sixth aspect of an example of the disclosure, a non-transitory computer-readable storage medium is provided, and stores a computer program on it. The program, when being executed by a processor, realizes steps in the data processing method applicable to a network side device according to the second aspect.

BRIEF DESCRIPTION OF THE DRAWINGS

In order to more clearly illustrate technical solutions in examples of the disclosure, the drawings that need to be used in the description of the examples will be briefly introduced below. Apparently, the drawings in the following description are some examples of the disclosure. For those of ordinary skill in the art, other drawings can be obtained based on these drawings without creative labor.

DETAILED DESCRIPTION

Technical solutions in examples of the disclosure will be clearly and completely described in conjunction with the accompanying drawings in the examples of the disclosure. Apparently, the described examples are a part of the examples of the disclosure, rather than all of the examples. All other examples obtained by those of ordinary skill in the art based on the examples in the disclosure without creative labor shall fall within the protection scope of the disclosure.

Figure 1:
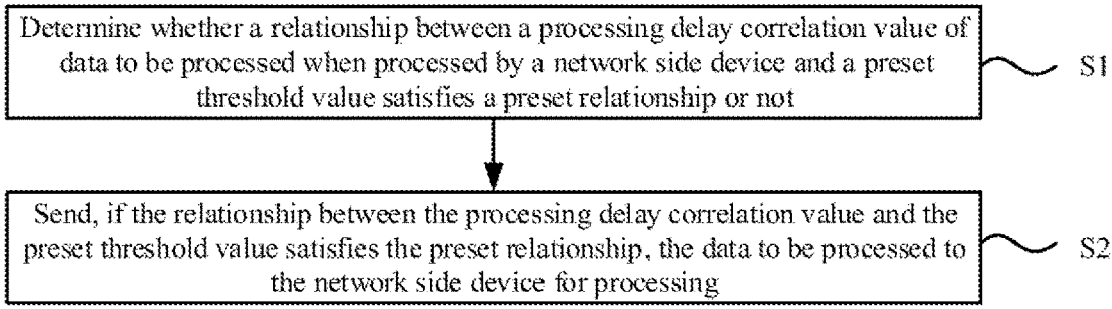
FIG. 1 is a schematic flow diagram of a data processing method illustrated according to an example of the disclosure.

FIG. 1 is a schematic flow diagram of a data processing method illustrated according to an example of the disclosure. The data processing method illustrated by the example may be applicable to a terminal. The terminal may be a phone, a tablet computer, a wearable device, and other electronic devices. The terminal may server as user equipment and communicates with a network side device. For instance, it may communicate with the network side device based on 4G or 5G.

As shown in FIG. 1, the data processing method may include:

in step S1, whether a relationship between a processing delay correlation value of data to be processed when processed by the network side device and a preset threshold value satisfies a preset relationship or not is determined; and in step S2, if the relationship between the processing delay correlation value and the preset threshold value satisfies the preset relationship, the data to be processed is sent to the network side device for processing.

In one example, for the data to be processed (i.e. data that needs to be processed), the processing delay correlation value of processing by the network side device may be first determined, and whether the relationship between the processing delay correlation value and the preset threshold value satisfies the preset relationship or not is determined.

The processing delay correlation value may be a processing delay itself, or may be a value correlated to the processing delay, such as a processing speed. The greater the processing speed is, the smaller the processing delay is.

For instance, the processing delay correlation value is the processing delay itself, the preset threshold value may then be a preset delay, and the preset relationship may be that the processing delay is smaller than the preset delay; and for instance, the processing delay correlation value is the processing speed, the preset threshold may be a preset speed, and the preset relationship may be that the processing speed is greater than the preset speed.

According to the example of the disclosure, under a condition that the relationship between the processing delay correlation value and the preset threshold value satisfies the preset relationship, for instance the processing delay is smaller than the preset delay, or the processing speed is greater than the preset speed, it may be determined that a delay caused by subjecting the data to be processed to processing by the network side device is relatively low, which easily meets a user's requirement for a low delay, so the data to be processed may be sent to the network side device for processing. The network side device may include a base station, a core network, etc.

Accordingly, under a condition that the delay caused by subjecting the data to be processed to processing by the network side device is relatively low, the data to be processed may be sent to the network side device for processing, so as to lower a size of data processed by the terminal, reduce a load of the terminal, and enhance an effect achieved by the network side device in a process of communicating with the terminal.

Under a condition that the relationship between the processing delay correlation value and the preset threshold does not satisfy the preset relationship, the terminal may process the data to be processed, so as to ensure that the processing delay is relatively low, consequently meeting the user's requirement.

Figure 2:
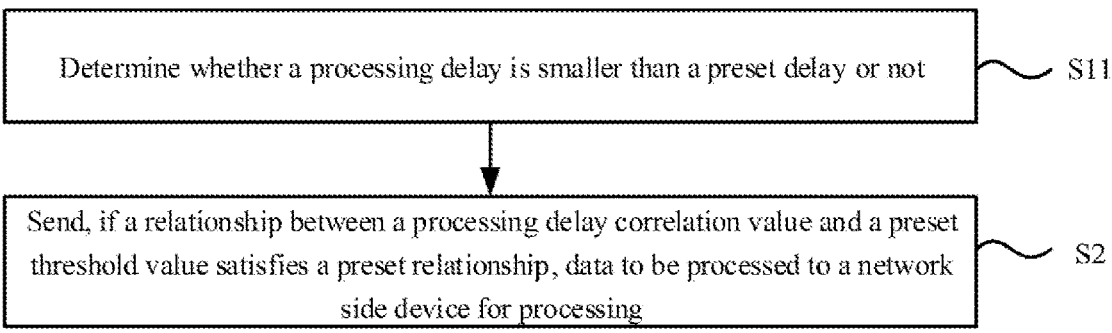
FIG. 2 is a schematic flow diagram of another data processing method illustrated according to an example of the disclosure.

FIG. 2 is a schematic flow diagram of another data processing method illustrated according to an example of the disclosure. As shown in FIG. 2, the processing delay correlation value is the processing delay, the preset threshold value is a preset delay, and determining whether the relationship between the processing delay correlation value of data to be processed when processed by the network side device and the preset threshold value satisfies a preset relationship or not includes:

in step S11, whether the processing delay is smaller than the preset delay or not is determined.

In one example, the processing delay correlation value may be the processing delay itself, the preset threshold value may then be the preset delay, and the preset relationship may be that the processing delay is smaller than the preset delay, so determining whether the relationship between the processing delay correlation value and the preset threshold value satisfies the preset relationship or not may specifically be determining whether the processing delay is smaller than the preset delay or not. Under a condition that the processing delay is smaller than the preset delay, it means that the network side device may rapidly complete processing of the data to be processed, which is conducive to meeting the user's requirement for a low delay, so it may be determined that the preset relationship is satisfied and the data to be processed may be sent to the network side device for processing.

Figure 3:
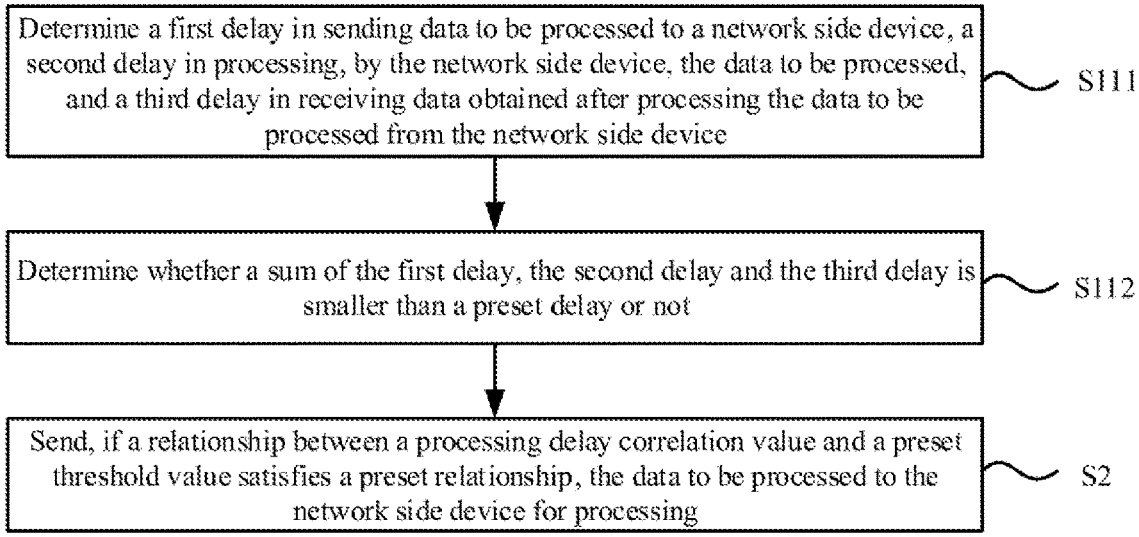
FIG. 3 is a schematic flow diagram of yet another data processing method illustrated according to an example of the disclosure.

FIG. 3 is a schematic flow diagram of yet another data processing method illustrated according to an example of the disclosure. As shown in FIG. 3, determining whether the processing delay is smaller than the preset delay or not includes:

in step S111, a first delay in sending the data to be processed to the network side device, a second delay in processing, by the network side device, the data to be processed, and a third delay in receiving data obtained after processing the data to be processed from the network side device are determined; and in step S112, whether a sum of the first delay, the second delay and the third delay is smaller than the preset delay or not is determined.

In an example, the delay caused by sending the data to be processed to the network side device for processing is not only in the network side device processing the data to be processed. A certain delay exists in both sending the data to be processed to the network side device and receiving processed data from the network side device.

In the example, the first delay in sending the data to be processed to the network side device, the second delay in processing, by the network side device, the data to be processed, and the third delay in receiving the data obtained after processing the data to be processed from the network side device may be determined; and then whether the sum of the first delay, the second delay and the third delay is smaller than the preset delay or not is determined.

Accordingly, when the processing delay is determined, the second delay in processing, by the network side device, the data to be processed may be considered, and the first delay in sending the data to be processed to the network side device as well as the third delay in receiving the data obtained after processing the data to be processed from the network side device may also be considered, so as to accurately determine the processing delay.

It needs to be noted that, the second delay in processing, by the network side device, the data to be processed needs to be determined by the terminal. The terminal may predict the second delay according to historical delays in data processing by the network side device (for instance, a mean value is calculated based on a plurality of delays in data processing), or the network side device may send its own ability information (for instance, the processing speed) in data processing to the terminal so that the terminal determines the second delay according to the ability information.

Figure 4:
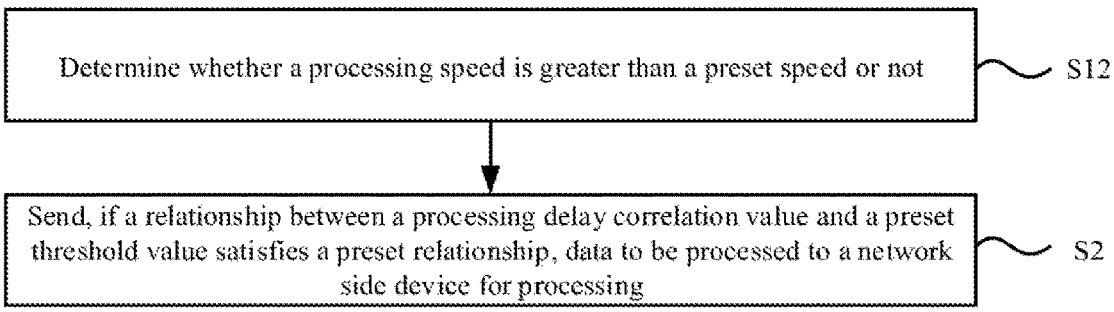
FIG. 4 is a schematic flow diagram of yet another data processing method illustrated according to an example of the disclosure.

FIG. 4 is a schematic flow diagram of yet another data processing method illustrated according to an example of the disclosure. As shown in FIG. 4, the processing delay correlation value is the processing speed, the preset threshold value is the preset speed, and determining whether the relationship between the processing delay correlation value of the data to be processed when processed by the network side device and the preset threshold value satisfies the preset relationship or not includes:

in step S12, whether the processing speed is greater than the preset speed or not is determined.

In one example, the processing delay correlation value may be the processing speed, the preset threshold value may be the preset speed, and the preset relationship may be that the processing speed is smaller than the preset speed, so determining whether the relationship between the processing delay correlation value and the preset threshold value satisfies the preset relationship or not may specifically be determining whether the processing speed is greater than the preset speed. Under a condition that the processing speed is greater than the preset speed, it means that the network side device may rapidly complete processing of the data to be processed, which is conducive to meeting the user's requirement for a low delay, so it may be determined that the preset relationship is satisfied and the data to be processed may be sent to the network side device for processing.

Figure 5:
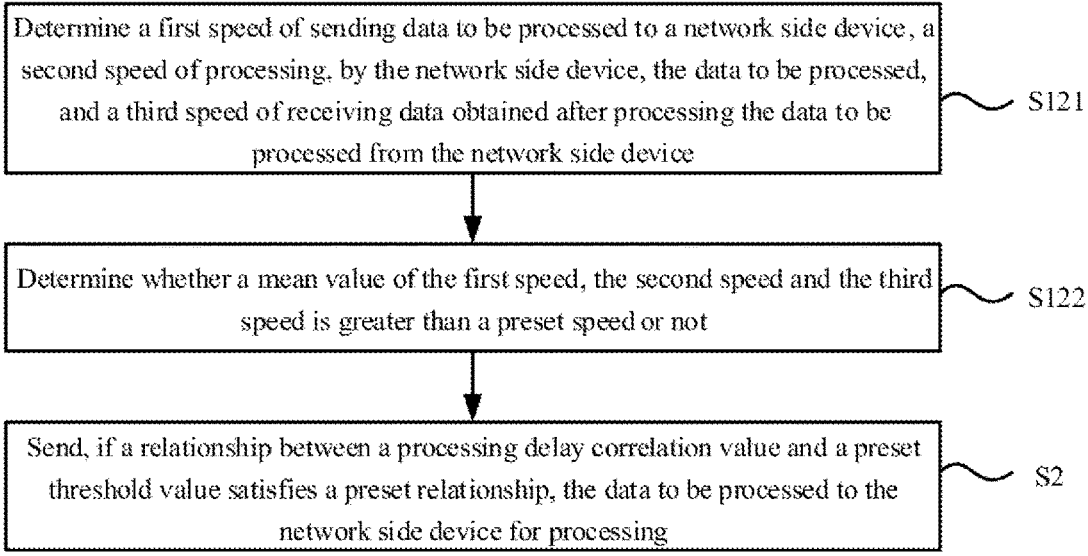
FIG. 5 is a schematic flow diagram of yet another data processing method illustrated according to an example of the disclosure.

FIG. 5 is a schematic flow diagram of yet another data processing method illustrated according to an example of the disclosure. As shown in FIG. 5, determining whether the processing speed is greater than the preset speed or not includes:

in step S121, a first speed of sending the data to be processed to the network side device, a second speed of processing, by the network side device, the data to be processed, and a third speed of receiving the data obtained after processing the data to be processed from the network side device are determined; and in step S122, whether a mean value of the first speed, the second speed and the third speed is greater than the preset speed or not is determined.

In one example, the delay caused by sending the data to be processed to the network side device for processing is not only in the network side device processing the data to be processed. A certain delay exists in both sending the data to be processed to the network side device and receiving the processed data from the network side device.

In the example, the first speed of sending the data to be processed to the network side device, the second speed of processing, by the network side device, the data to be processed, and the third speed of receiving the data obtained after processing the data to be processed from the network side device may be determined; and then whether the mean value of the first speed, the second speed and the third speed is greater than the preset speed or not is determined.

Accordingly, when the processing speed is determined, the second speed of processing, by the network side device, the data to be processed may be considered, and the first speed of sending the data to be processed to the network side device as well as the third speed of receiving the data obtained after processing the data to be processed from the network side device may also be considered, so as to accurately determine the processing speed.

It needs to be noted that, the second speed of the network side device processing the data to be processed needs to be determined by the terminal. The terminal may predict (for instance, a mean value is calculated based on a plurality of speeds in data processing) the second speed according to historical data processing speeds of the network side device, or the network side device may send its own ability information (for instance, the processing speed) in data processing to the terminal so that the terminal determines the second speed according to the ability information.

Figure 6:
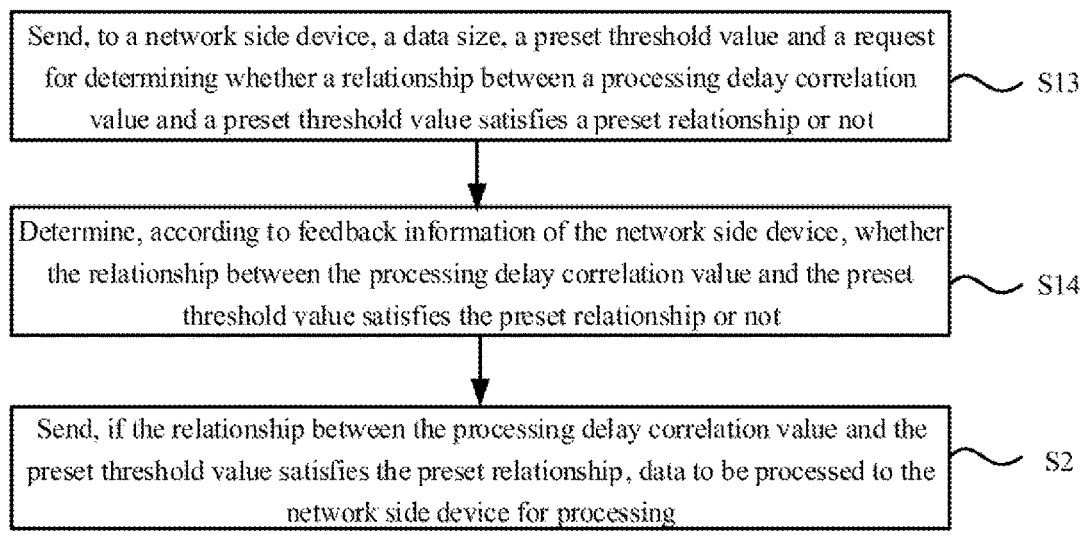
FIG. 6 is a schematic flow diagram of yet another data processing method illustrated according to an example of the disclosure.

FIG. 6 is schematic flow diagram of yet another data processing method illustrated according to an example of the disclosure. As shown in FIG. 6, determining whether the relationship between the processing delay correlation value of data to be processed when processed by the network side device and the preset threshold value satisfies a preset relationship or not includes:

in step S13, a data size of the data to be processed, the preset threshold value and a request for determining whether the relationship between the processing delay correlation value and the preset threshold value satisfies the preset relationship or not are sent to the network side device; and in step S14, whether the relationship between the processing delay correlation value and the preset threshold value satisfies the preset relationship or not is determined according to feedback information of the network side device.

In one example, an operation of determining whether the relationship between the processing delay correlation value and the preset threshold value satisfies the preset relationship or not may be executed by the terminal, and may also be executed by the network side device, so as to reduce the load of the terminal.

When the network side device needs to determine whether the relationship between the processing delay correlation value and the preset threshold value satisfies the preset relationship or not, the terminal may send the data size of the data to be processed, the preset threshold value and the request for determining whether the relationship between the processing delay correlation value and the preset threshold value satisfies the preset relationship or not to the network side device.

The network side device may determine that whether the relationship between the processing delay correlation value and the preset threshold value satisfies the preset relationship or not needs to be determined based on the request, then may determine the processing delay correlation value according to the data size of the data to be processed, and then may determine whether the relationship between the processing delay correlation value and the preset threshold value satisfies the preset relationship or not according to the processing delay correlation value and the preset threshold value.

Figure 7:
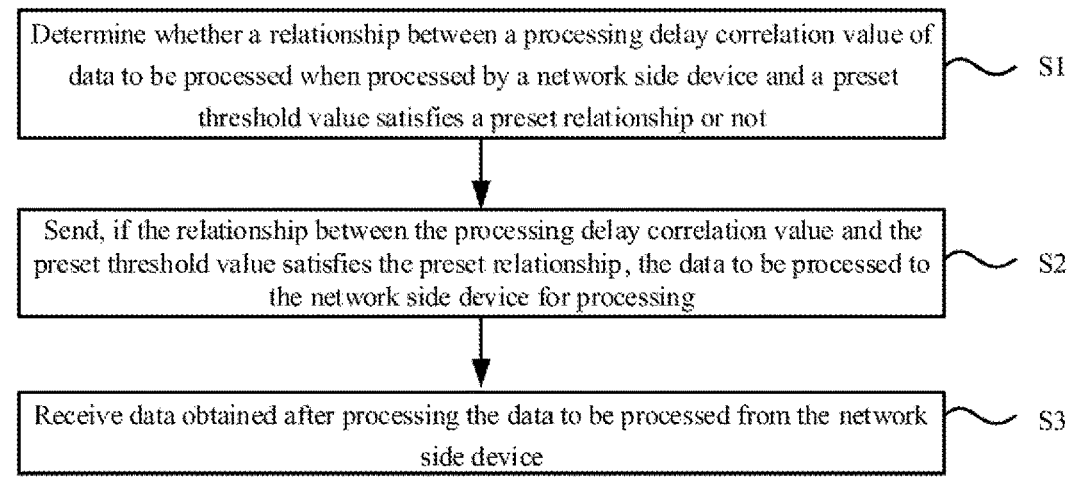
FIG. 7 is a schematic flow diagram of yet another data processing method illustrated according to an example of the disclosure.

FIG. 7 is a schematic flow diagram of yet another data processing method illustrated according to an example of the disclosure. As shown in FIG. 7, the method further includes:

in step S3, the data obtained after the network side processes the data to be processed is received.

In one example, the network side device may send the processed data to the terminal, and the terminal may receive the data obtained after the network side device processes the data to be processed.

Alternatively, the network side device includes at least one of:

the base station, and the core network.

Figure 8:
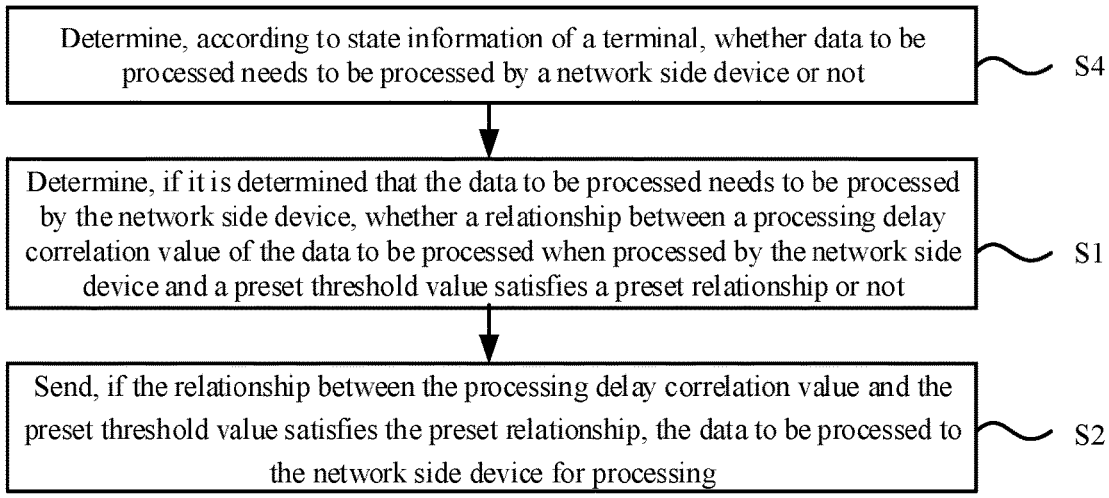
FIG. 8 is a schematic flow diagram of yet another data processing method illustrated according to an example of the disclosure.

FIG. 8 is a schematic flow diagram of yet another data processing method illustrated according to an example of the disclosure. As shown in FIG. 8, before determining whether the relationship between the processing delay correlation value of the data to be processed when processed by the network side device and the preset threshold value satisfies the preset relationship or not, the method further includes:

in step S4, whether the data to be processed needs to be processed by the network side device or not is determined according to state information of the terminal.

If it is determined that the data to be processed needs to be processed by the network side device, step S1, determining whether the relationship between the processing delay correlation value of the data to be processed when processed by the network side device and the preset threshold value satisfies the preset relationship or not, is executed.

In one example, whether the data to be processed needs to be processed by the network side device or not may be determined according to the state information of the terminal. The state information of the terminal may include an electric quantity, a load of a processor, etc. To take the electric quantity as an instance, when the electric quantity is lower than a preset electric quantity, it may be determined that the data to be processed needs to be processed by the network side device; and to take the load of the processor as an instance, when the load of the processor is higher than a preset load, it may be determined that the data to be processed needs to be processed by the network side device.

The state information of the terminal itself may reflect abilities of the terminal in some aspects to a certain extent. For instance, if the load of the processor is relatively high, a processing ability for the data to be processed may be relatively low; and for instance, if the electric quantity is relatively low, a cruising ability of the terminal may be relatively low.

In the example, the abilities of the terminal may be considered according to the state information of the terminal, so as to determine whether the data to be processed needs to be processed by the network side device or not; and under a condition of determining that the data to be processed needs to be processed by the network side device, whether the relationship between the processing delay correlation value and the preset threshold value satisfies the preset relationship or not is determined, so as to ensure that the terminal has good abilities and that the data to be processed can be timely processed.

Figure 9:
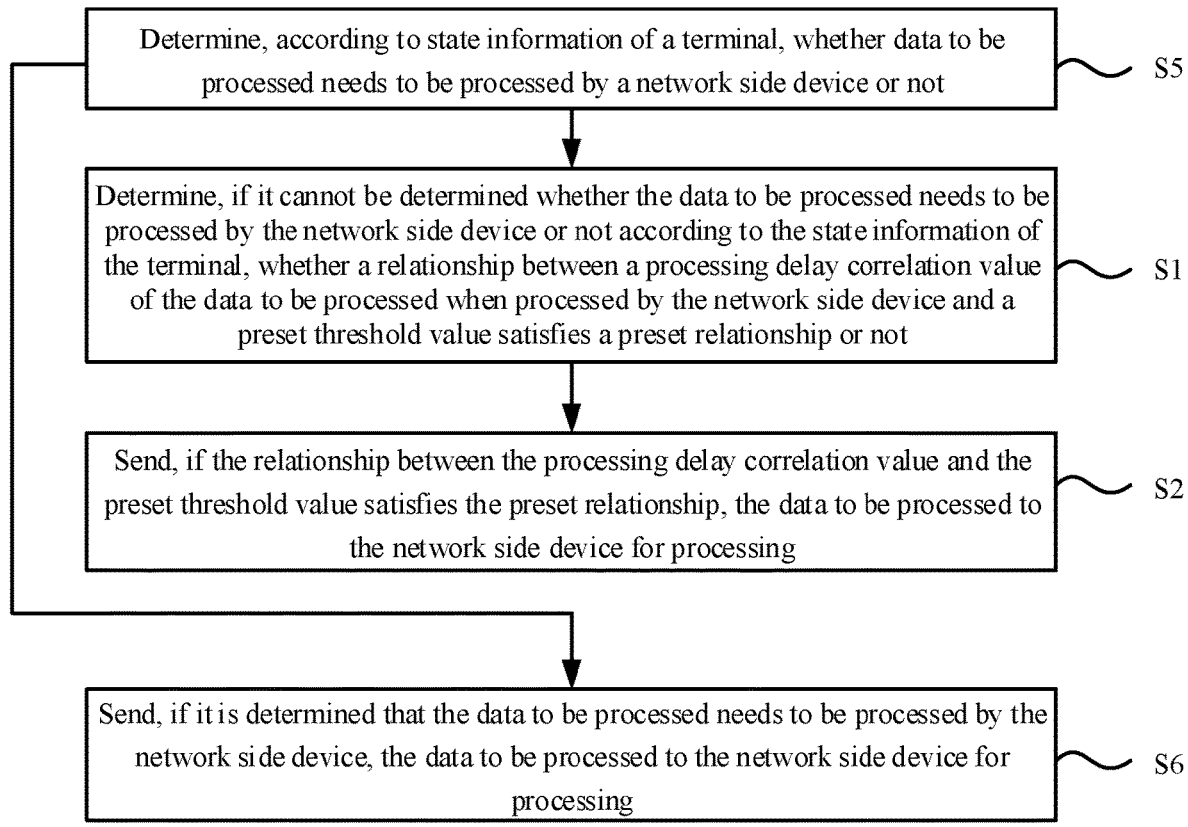
FIG. 9 is a schematic flow diagram of yet another data processing method illustrated according to an example of the disclosure.

FIG. 9 is a schematic flow diagram of yet another data processing method illustrated according to an example of the disclosure. As shown in FIG. 9, before determining whether the relationship between the processing delay correlation value of the data to be processed when processed by the network side device and the preset threshold value satisfies the preset relationship or not, the method further includes:

in step S5, whether the data to be processed needs to be processed by the network side device or not is determined according to the state information of the terminal; and in step S6, if it is determined that the data to be processed needs to be processed by the network side device, the data to be processed is sent to the network side device for processing.

If it cannot be determined whether the data to be processed needs to be processed by the network side device or not according to the state information of the terminal, step S1, determining whether the relationship between the processing delay correlation value of the data to be processed when processed by the network side device and the preset threshold value satisfies the preset relationship or not, is executed.

In one example, similar to the example shown in FIG. 8, the abilities of the terminal may also be considered according to the state information of the terminal, so as to determine whether the data to be processed needs to be sent to the network side device for processing or not. A difference lies in that, under a condition of determining that the data to be processed needs to be processed by the network side device, the data to be processed may be directly sent to the network side device for processing, and whether the relationship between the processing delay correlation value and the preset threshold value satisfies the preset relationship or not does not need to be determined, so it is ensured to the greatest extent that the terminal has good abilities.

When it cannot be determined whether the data to be processed needs to be processed by the network side device or not according to the state information of the terminal (for instance, accurate state information of the terminal cannot be obtained), whether the relationship between the processing delay correlation value of the data to be processed when processed by the network side device and the preset threshold value satisfies the preset relationship or not may be determined.

Alternatively, the state information includes at least one of:

the electric quantity, and the load of the processor.

Figure 10:
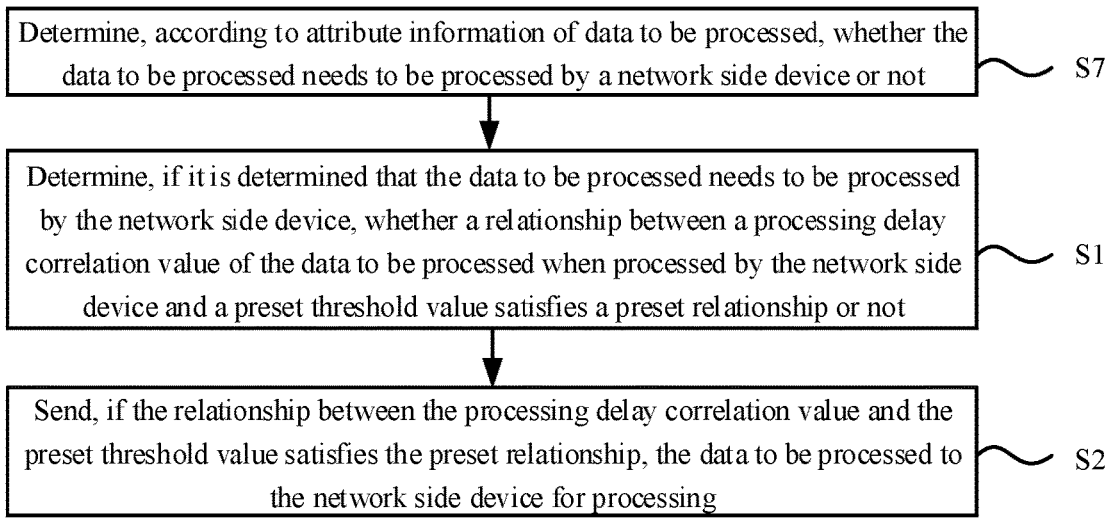
FIG. 10 is a schematic flow diagram of yet another data processing method illustrated according to an example of the disclosure.

FIG. 10 is a schematic flow diagram of yet another data processing method illustrated according to an example of the disclosure. As shown in FIG. 10, before determining whether the relationship between the processing delay correlation value of the data to be processed when processed by the network side device and the preset threshold value satisfies the preset relationship or not, the method further includes:

in step S7, whether the data to be processed needs to be processed by the network side device or not is determined according to attribute information of the data to be processed.

If it is determined that the data to be processed needs to be processed by the network side device, step S1, determining whether the relationship between the processing delay correlation value of the data to be processed when processed by the network side device and the preset threshold value satisfies the preset relationship or not, is executed.

In one example, whether the data to be processed needs to be processed by the network side device or not may be determined according to the attribute information of the data to be processed. The attribute information of the data to be processed includes the data size, a data type, etc. To take the data size as an instance, when the data size is greater than a preset data size, it may be determined that the data to be processed needs to be processed by the network side device; and to take the data type as an instance, when the data type belongs to data that needs to be processed by a machine learning model, it may be determined that the data to be processed needs to be processed by the network side device.

The attribute information of the data to be processed may reflect an overhead of the terminal in processing the data to be processed to a certain extent. For instance, if the data size is relatively large, the overhead of the terminal in processing the data to be processed is relatively large, and a caused delay may be relatively high; and for instance, if the data type belongs to the data that needs to be processed by the machine learning model, the terminal needs to perform machine learning according to abundant sample data to obtain the model before processing the data to be processed, causing a relatively large overhead.

In the example, the overhead of the terminal in processing the data to be processed may be considered according to the attribute information of the data to be processed, so as to determine whether the data to be processed needs to be sent to the network side device for processing or not; and under a condition of determining that the data to be processed needs to be processed by the network side device, whether the relationship between the processing delay correlation value and the preset threshold value satisfies the preset relationship or not is determined, so as to ensure that no excessively large overhead of the terminal is caused and that the data to be processed can be timely processed.

Figure 11:
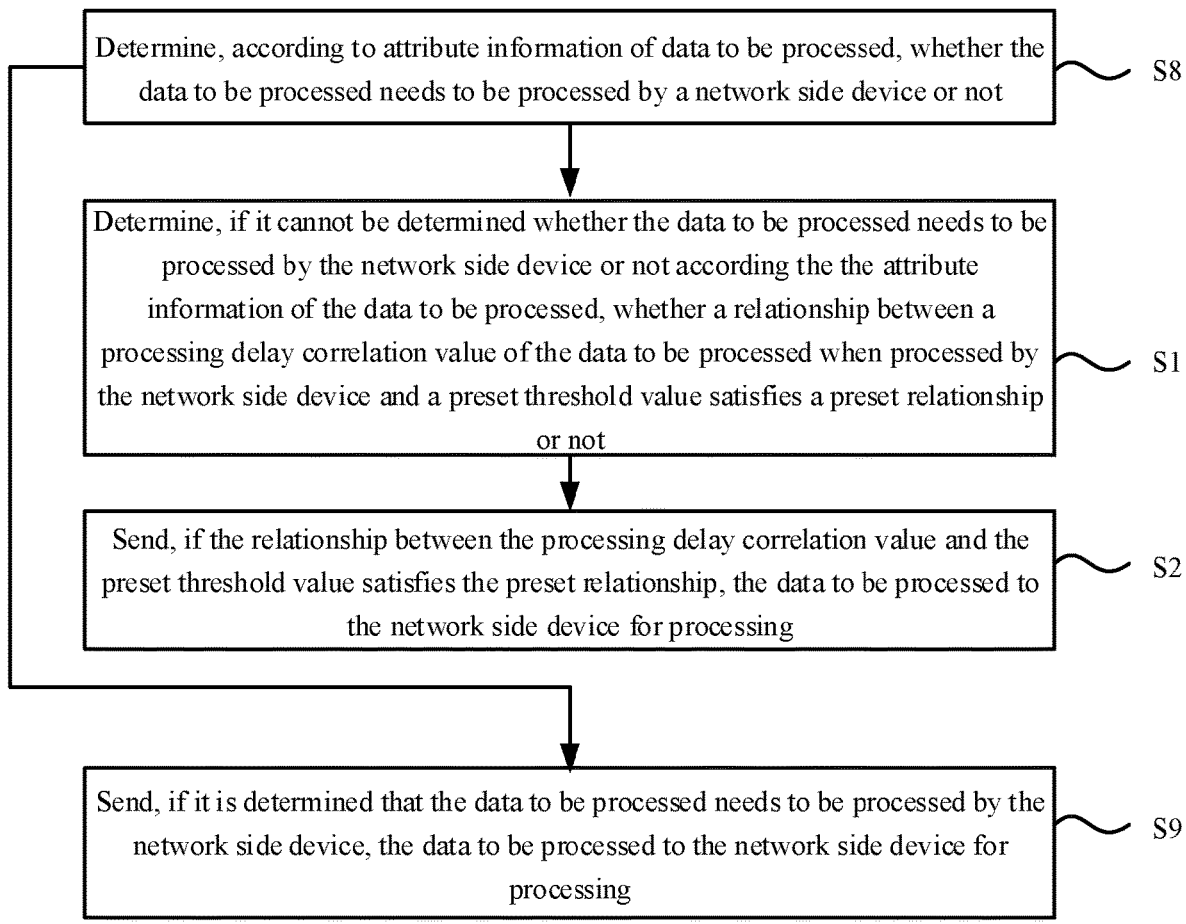
FIG. 11 is a schematic flow diagram of yet another data processing method illustrated according to an example of the disclosure.

FIG. 11 is a schematic flow diagram of yet another data processing method illustrated according to an example of the disclosure. As shown in FIG. 11, before determining whether the relationship between the processing delay correlation value of the data to be processed when processed by the network side device and the preset threshold value satisfies the preset relationship or not, the method further includes:

in step S8, whether the data to be processed needs to be processed by the network side device or not is determined according to the attribute information of the data to be processed; and in step S9, if it is determined that the data to be processed needs to be processed by the network side device, the data to be processed is sent to the network side device for processing.

If it cannot be determined whether the data to be processed needs to be processed by the network side device or not according to the attribute information of the data to be processed, step S1, determining whether the relationship between the processing delay correlation value of the data to be processed when processed by the network side device and the preset threshold value satisfies the preset relationship or not, is executed.

In one example, similar to the example shown in FIG. 10, the overhead of the terminal in processing the data to be processed may be considered according to the attribute information of the data to be processed, so as to determine whether the data to be processed needs to be sent to the network side device for processing or not. A difference lies in that, under a condition of determining that the data to be processed needs to be processed by the network side device, the data to be processed may be directly sent to the network side device for processing, and whether the relationship between the processing delay correlation value and the preset threshold value satisfies the preset relationship or not does not need to be determined, so it is ensured to the greatest extent that no excessively large overhead of the terminal is caused.

When it cannot be determined whether the data to be processed needs to be processed by the network side device or not according to the attribute information of the data to be processed (for instance, accurate attribute information of the data to be processed cannot be obtained), whether the relationship between the processing delay correlation value of the data to be processed when processed by the network side device and the preset threshold value satisfies the preset relationship or not may be determined.

Alternatively, the attribute information includes at least one of:
the data size, and the data type.

Figure 12:
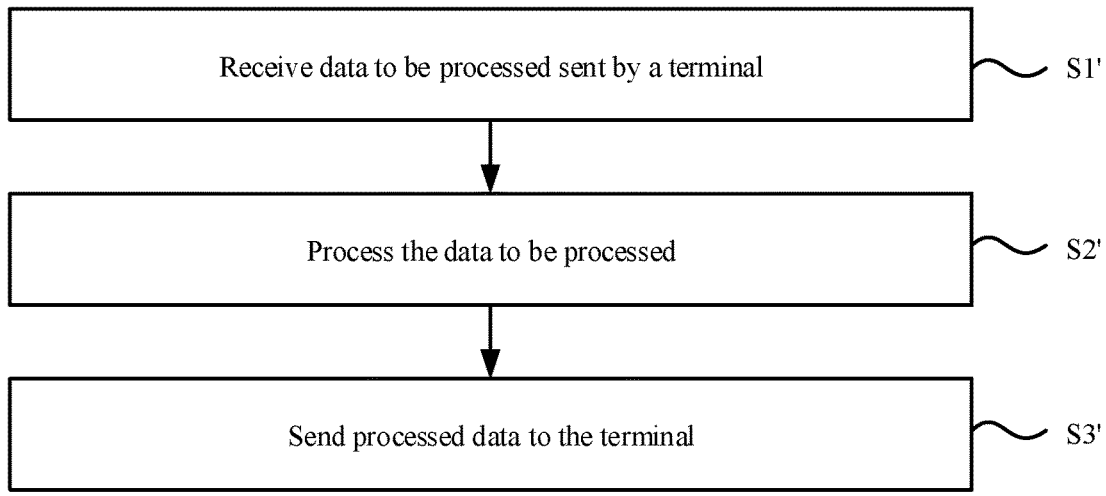
FIG. 12 is a schematic flow diagram of a data processing method illustrated according to an example of the disclosure.

FIG. 12 is a schematic flow diagram of a data processing method illustrated according to an example of the disclosure. The data processing method illustrated by the example may be applicable to a network side device. The network side device may communicates with a terminal. The terminal serves as an user equipment. For instance, it may communicates with the terminal based on 4G or 5G. The terminal may be a cellphone, a tablet computer, a wearable device or other electronic devices.

As shown in FIG. 12, the data processing method may include:
in step S1', data to be processed sent by the terminal is received;
in step S2', the data to be processed is processed; and
in step S3', processed data is sent to the terminal.

According to the example of the disclosure, the terminal may send the data to be processed to the network side device for processing, so as to lower a size of data processed by the terminal, reduce a load of the terminal, and enhance an effect achieved by the network side device in a process of communicating with the terminal.

Figure 13:
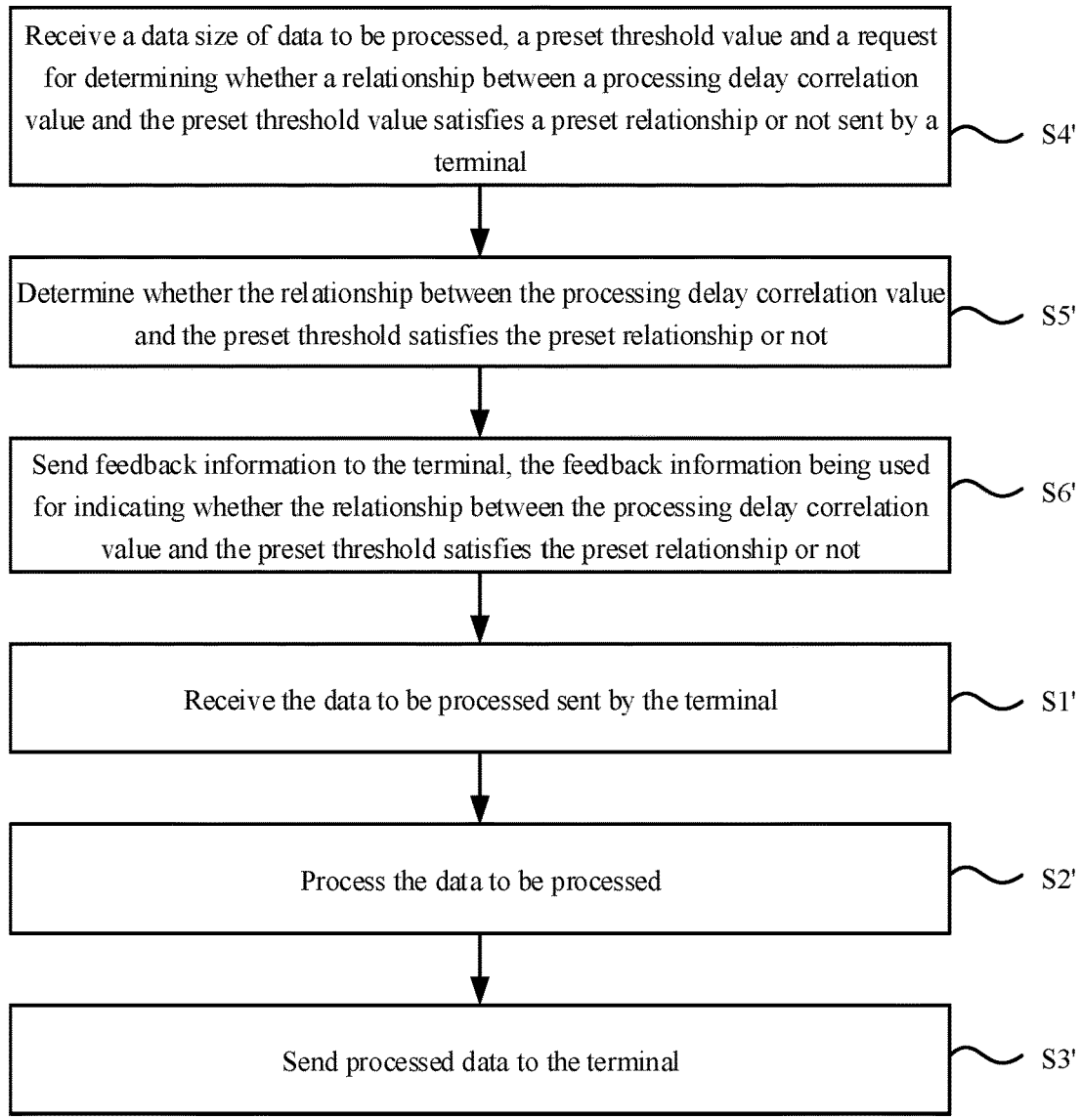
FIG. 13 is a schematic flow diagram of another data processing method illustrated according to an example of the disclosure.

FIG. 13 is a schematic flow diagram of another data processing method illustrated according to an example of the disclosure. As shown in FIG. 13, before receiving the data to be processed sent by the terminal, the method further includes:
in step S4', a data size of the data to be processed, a preset threshold value and a request for determining whether a relationship between a processing delay correlation value and the preset threshold value satisfies a preset relationship or not sent by the terminal are received;
in step S5', whether the relationship between the processing delay correlation value and the preset threshold satisfies the preset relationship or not is determined; and
in step S6', feedback information is sent to the terminal. The feedback information is used for indicating whether the relationship between the processing delay correlation value and the preset threshold satisfies the preset relationship or not.

In one example, the network side device may further determine whether the relationship between the processing delay correlation value and the preset threshold satisfies the preset relationship or not.

First, the terminal may send the data size of the data to be processed, the preset threshold value and the request for determining whether the relationship between the processing delay correlation value and the preset threshold value satisfies the preset relationship or not to the network side device. The network side device may determine that whether the relationship between the processing delay correlation value and the preset threshold value satisfies the preset relationship or not needs to be determined based on the request, then may determine the processing delay correlation value according to the data size of the data to be processed, and then may determine whether the relationship between the processing delay correlation value and the preset threshold value satisfies the preset relationship or not according to the processing delay correlation value and the preset threshold value.

Under a condition that the relationship between the processing delay correlation value and the preset threshold value satisfies the preset relationship, the terminal may subject the data to be processed to the network side device for processing, so as to ensure that a delay caused by processing the data to be processed is relatively low, which easily meets a user's requirement for a low delay.

Figure 14:
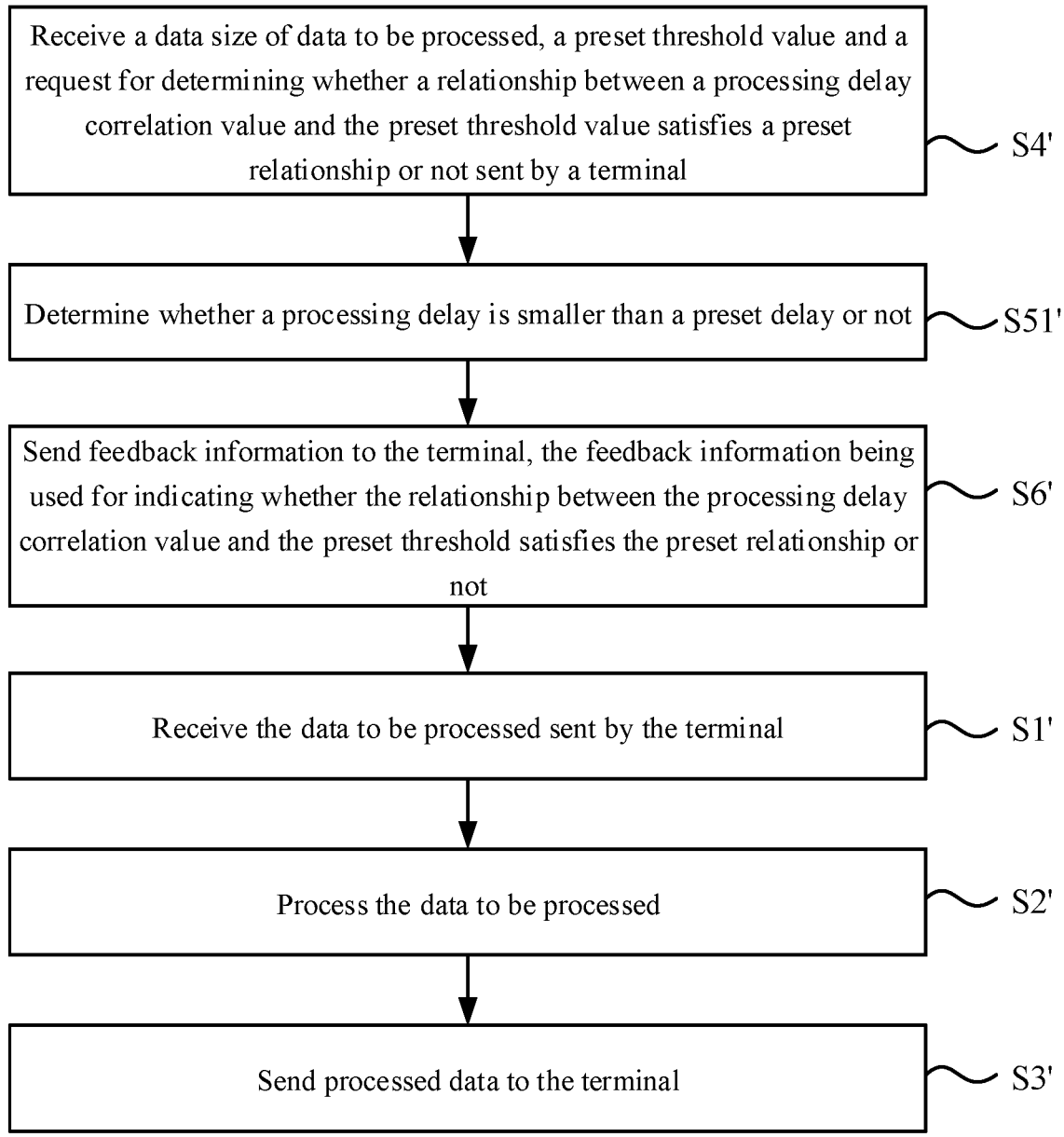
FIG. 14 is a schematic flow diagram of yet another data processing method illustrated according to an example of the disclosure.

FIG. 14 is a schematic flow diagram of yet another data processing method illustrated according to an example of the disclosure. As shown in FIG. 14, the processing delay correlation value is a processing delay, the preset threshold value is a preset delay, and determining whether the relationship between the processing delay correlation value of the data to be processed when processed by the network side device and the preset threshold value satisfies the preset relationship or not includes:
in step S51', whether the processing delay is smaller than the preset delay or not is determined.

In one example, the processing delay correlation value may be the processing delay itself, the preset threshold value may then be the preset delay, and the preset relationship may be that the processing delay is smaller than the preset delay, so determining whether the relationship between the processing delay correlation value and the preset threshold value satisfies the preset relationship or not may specifically be determining whether the processing delay is smaller than the preset delay or not. Under a condition that the processing delay is smaller than the preset delay, it means that the network side device may rapidly complete processing of the data to be processed, which is conducive to meeting the user's requirement for the low delay, so it may be determined that the preset relationship is satisfied and the data to be processed may be sent to the network side device for processing.

Figure 15:
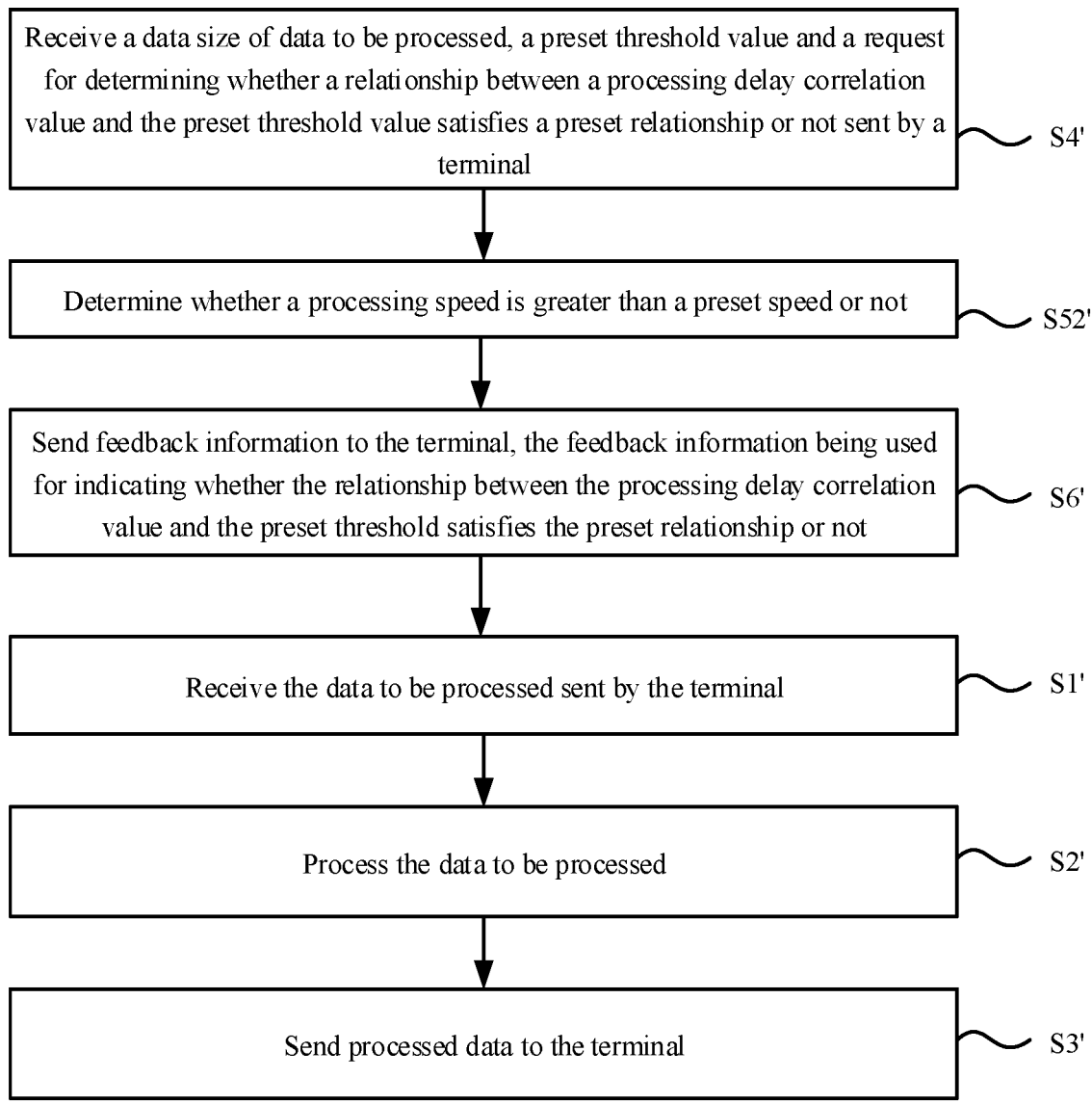
FIG. 15 is a schematic flow diagram of yet another data processing method illustrated according to an example of the disclosure.

FIG. 15 is a schematic flow diagram of yet another data processing method illustrated according to an example of the disclosure. As shown in FIG. 15, determining whether the processing delay is smaller than the preset delay or not includes:
in step S511', a first delay in sending, by the terminal, the data to be processed to the network side device, a second delay in processing the data to be processed, and a third delay in sending the processed data to the terminal are determined; and
in step S512', whether a sum of the first delay, the second delay and the third delay is smaller than the preset delay or not is determined.

In one example, the delay caused by sending the data to be processed to the network side device for processing is not only in the network side device processing the data to be processed. A certain delay exists in both sending the data to be processed to the network side device and receiving the processed data from the network side device.

In the example, the first delay in sending the data to be processed to the network side device, the second delay in processing, by the network side device, the data to be processed, and the third delay in receiving the data obtained after processing the data to be processed from the network side device may be determined; and then whether the sum of the first delay, the second delay and the third delay is smaller than the preset delay or not is determined.

Accordingly, when the processing delay is determined, the second delay in processing, by the network side device, the data to be processed may be considered, and the first delay in sending the data to be processed to the network side device as well as the third delay in receiving the data obtained after processing the data to be processed from the network side device may also be considered, so as to accurately determine the processing delay.

Figure 16:
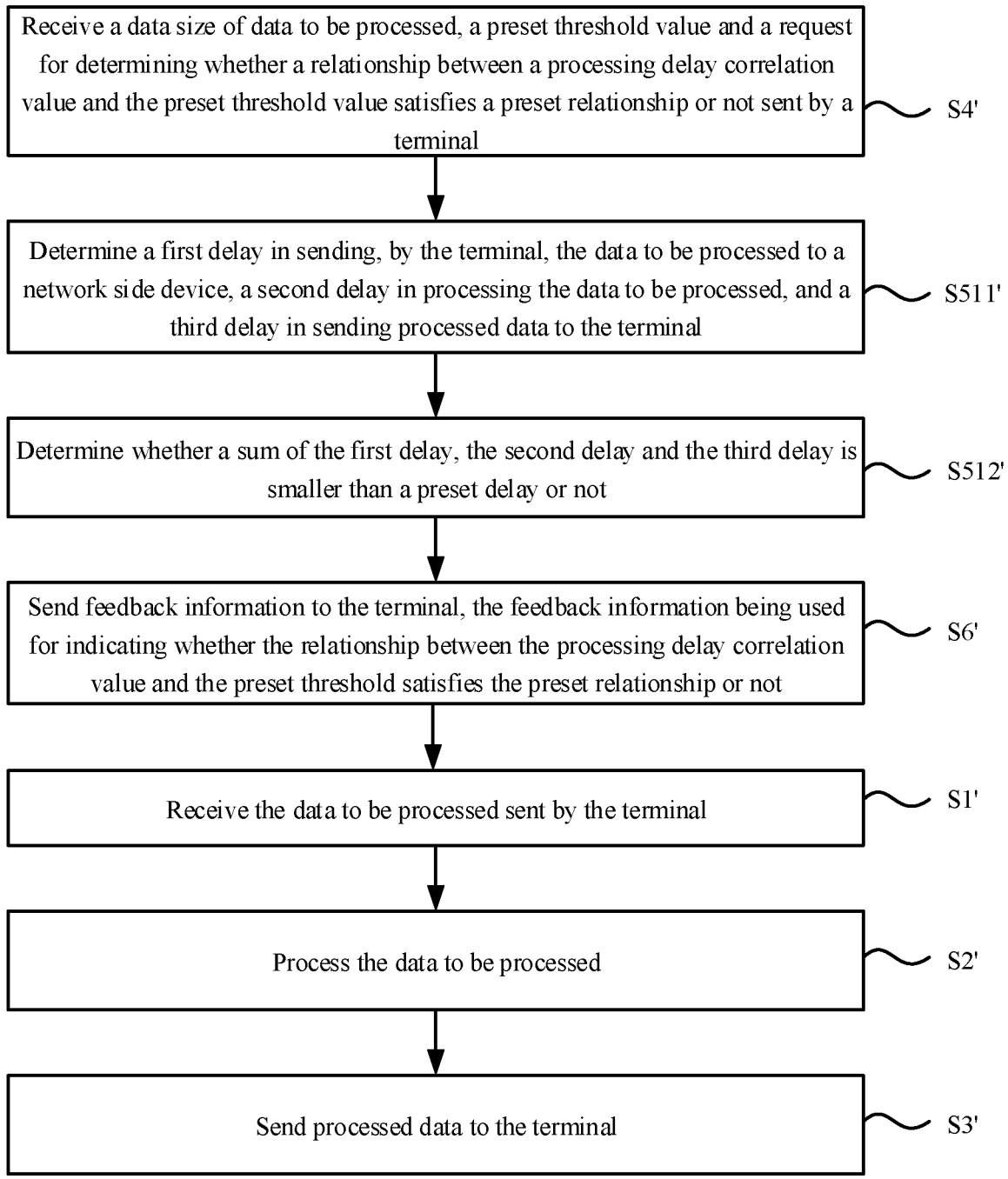
FIG. 16 is a schematic flow diagram of yet another data processing method illustrated according to an example of the disclosure.

FIG. 16 is a schematic flow diagram of yet another data processing method illustrated according to an example of the disclosure. As shown in FIG. 16, the processing delay correlation value is a processing speed, the preset threshold value is a preset speed, and determining whether the relationship between the processing delay correlation value of the data to be processed when processed by the network side device and the preset threshold value satisfies the preset relationship or not includes:

in step S52', whether the processing speed is greater than the preset speed or not is determined.

In one example, the processing delay correlation value may be the processing speed, the preset threshold value may be the preset speed, and the preset relationship may be that the processing speed is smaller than the preset speed, so determining whether the relationship between the processing delay correlation value and the preset threshold value satisfies the preset relationship or not may specifically be determining whether the processing speed is greater than the preset speed or not. Under a condition that the processing speed is greater than the preset speed, it means that the network side device may rapidly complete processing of the data to be processed, which is conducive to meeting the user's requirement for the low delay, so it may be determined that the preset relationship is satisfied and the data to be processed may be sent to the network side device for processing.

Figure 17:
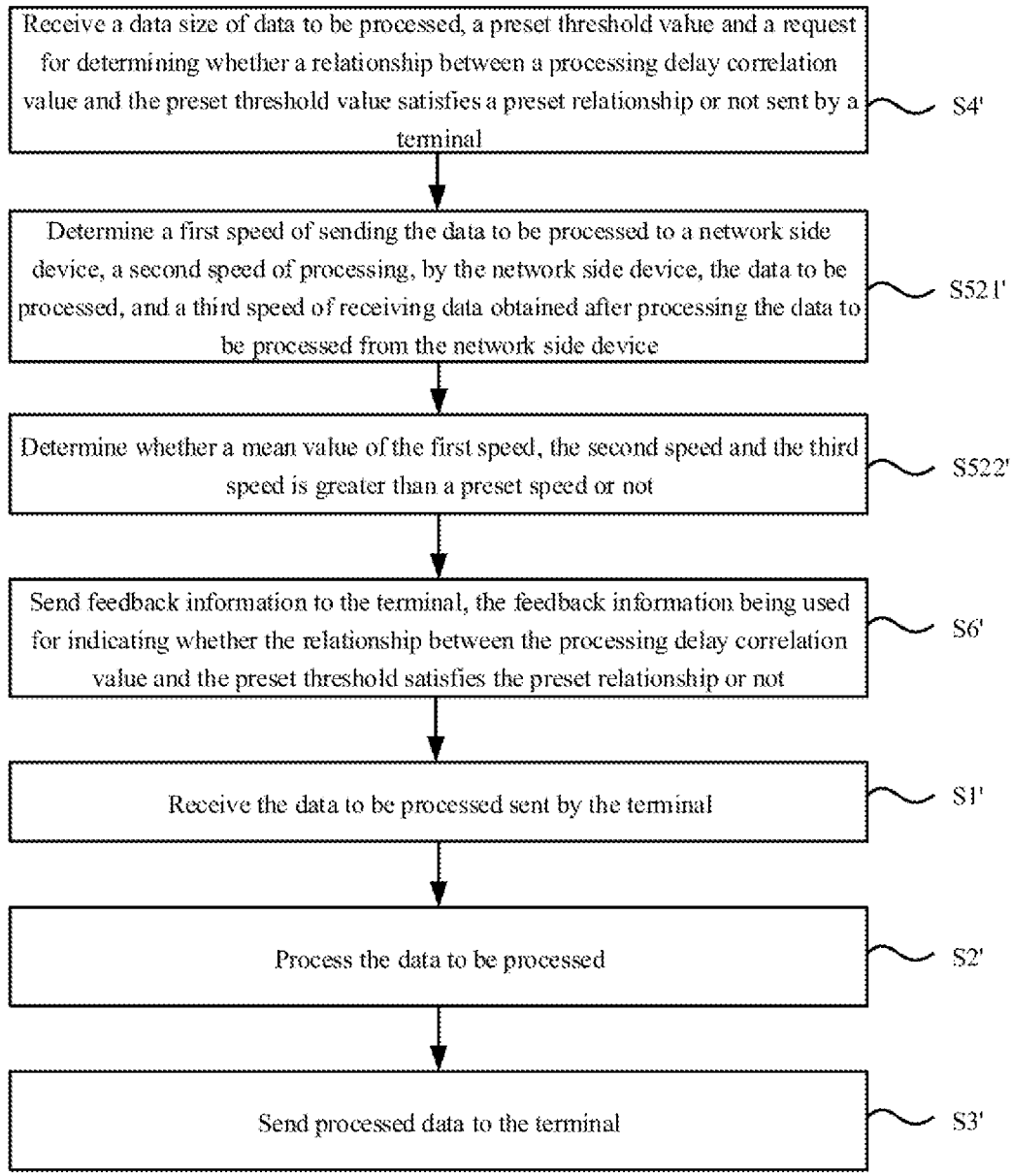
FIG. 17 is a schematic flow diagram of yet another data processing method illustrated according to an example of the disclosure.

FIG. 17 is a schematic flow diagram of yet another data processing method illustrated according to an example of the disclosure. As shown in FIG. 17, determining whether the processing speed is greater than the preset speed or not includes:

in step S521', a first speed of sending the data to be processed to the network side device, a second speed of processing, by the network side device, the data to be processed, and a third speed of receiving the data obtained after processing the data to be processed from the network side device are determined; and in step S522', whether a mean value of the first speed, the second speed and the third speed is greater than the preset speed or not is determined.

In one example, the delay caused by sending the data to be processed to the network side device for processing is not only in the network side device processing the data to be processed. A certain delay exists in both sending the data to be processed to the network side device and receiving the processed data from the network side device.

In the example, the first speed of sending the data to be processed to the network side device, the second speed of processing, by the network side device, the data to be processed, and the third speed of receiving the data obtained after processing the data to be processed from the network side device may be determined; and then whether the mean value of the first speed, the second speed and the third speed is greater than the preset speed or not is determined.

Accordingly, when the processing speed is determined, the second speed of processing, by the network side device, the data to be processed may be considered, and the first speed of sending the data to be processed to the network side device as well as the third speed of receiving the data obtained after processing the data to be processed from the network side device may also be considered, so as to accurately determine the processing speed.

Alternatively, the network side device includes at least one of:

a base station, and a core network.

Corresponding to the aforesaid data processing method applicable to a terminal and the data processing method applicable to a network side device, the disclosure further provides examples of a data processing apparatus applicable to the terminal and a data processing apparatus applicable to the network side device.

Figure 18:
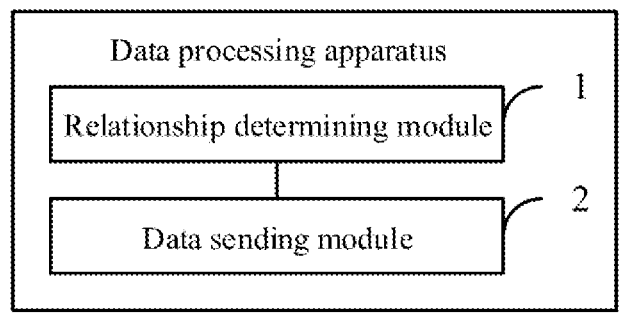
FIG. 18 is a schematic block diagram of a data processing apparatus illustrated according to an example of the disclosure.

FIG. 18 is a schematic block diagram of a data processing apparatus illustrated according to an example of the disclosure. The data processing apparatus illustrated by the example may be applicable to a terminal. The terminal may be a cellphone, a tablet computer, a wearable device or other electronic devices. The terminal may serve as user equipment and communicates with a network side device. For instance, it may communicate with the network side device based on 4G or 5G.

As shown in FIG. 18, the data processing apparatus may include:

a relationship determining module 1, configured to determine whether a relationship between a processing delay correlation value of data to be processed when processed by the network side device and a preset threshold value satisfies a preset relationship or not; and a data sending module 2, configured to send the data to be processed to the network side device for processing under a condition that the relationship between the processing delay correlation value and the present threshold satisfies the preset relationship.

Alternatively, the processing delay correlation value is a processing delay, the preset threshold value is a preset delay, and the relationship determining module is configured to determine whether the processing delay is smaller than the preset delay or not.

Figure 19:
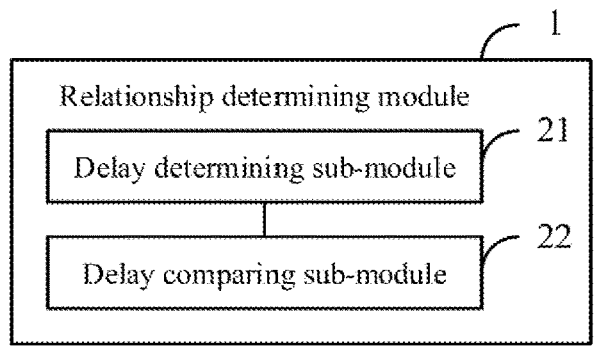
FIG. 19 is a schematic block diagram of a relationship determining module illustrated according to an example of the disclosure.

FIG. 19 is a schematic block diagram of a relationship determining module illustrated according to an example of the disclosure. As shown in FIG. 19, the relationship determining module 1 includes:

a delay determining sub-module 21, configured to determine a first delay in sending the data to be processed to the network side device, a second delay in processing, by the network side device, the data to be processed, and a third delay in receiving data obtained after processing the data to be processed from the network side device; and a delay comparing sub-module 22, configured to determine whether a sum of the first delay, the second delay and the third delay is smaller than the preset delay or not.

Alternatively, the processing delay correlation value is a processing speed, the preset threshold value is a preset speed, and the relationship determining module is configured to determine whether the processing speed is greater than the preset speed or not.

Figure 20:
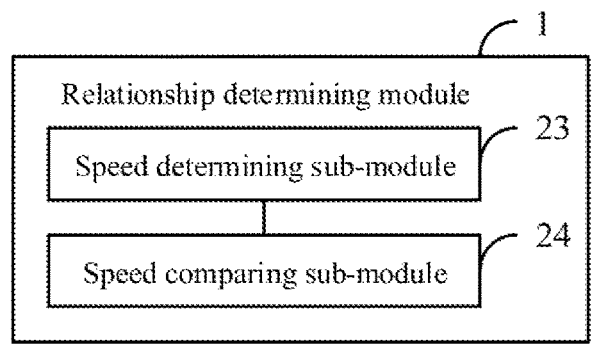
FIG. 20 is a schematic block diagram of another relationship determining module illustrated according to an example of the disclosure.

FIG. 20 is a schematic block diagram of another relationship determining module illustrated according to an example of the disclosure. As shown in FIG. 20, the relationship determining module 1 includes:

a speed determining sub-module 23, configured to determine a first speed of sending the data to be processed to the network side device, a second speed of processing, by the network side device, the data to be processed, and a third speed of receiving data obtained after processing the data to be processed from the network side device; and a speed comparing sub-module 24, determining whether a mean value of the first speed, the second speed and the third speed is greater than the preset speed or not.

Figure 21:
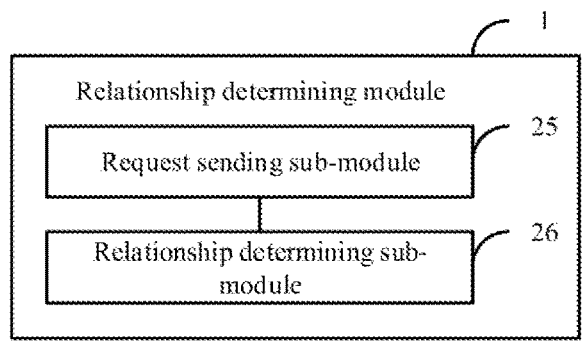
FIG. 21 is a schematic block diagram of yet another relationship determining module illustrated according to an example of the disclosure.

FIG. 21 is a schematic block diagram of yet another relationship determining module illustrated according to an example of the disclosure. As shown in FIG. 21, the relationship determining module 1 includes:

a request sending sub-module 25, configured to send, to the network side device, a data size of the data to be processed, the preset threshold value and a request for determining whether the relationship between the processing delay correlation value and the preset threshold value satisfies the preset relationship or not; and a relationship determining sub-module 26, configured to determine, according to feedback information of the network side device, whether the relationship between the processing delay correlation value and the preset threshold value satisfies the preset relationship or not.

Figure 22:
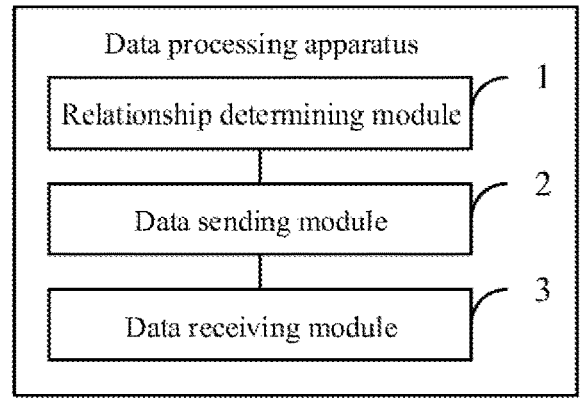
FIG. 22 is a schematic block diagram of another data processing apparatus illustrated according to an example of the disclosure.

FIG. 22 is a schematic block diagram of another data processing apparatus illustrated according to an example of the disclosure. As shown in FIG. 22, the apparatus further includes:

a data receiving module 3, configured to receive the data obtained after the network side device processes the data to be processed.

Alternatively, the network side device includes at least one of:

a base station, and a core network.

Figure 23:
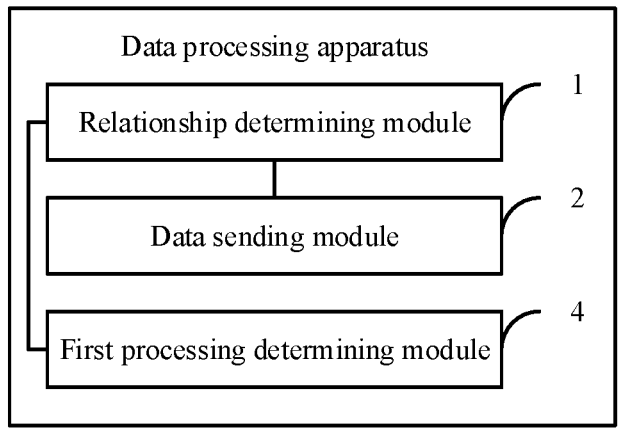
FIG. 23 is a schematic block diagram of yet another data processing apparatus illustrated according to an example of the disclosure.

FIG. 23 is a schematic block diagram of yet another data processing apparatus illustrated according to an example of the disclosure. As shown in FIG. 23, the apparatus further includes:

a first processing determining module 4, configured to determine, according to state information of the terminal, whether the data to be processed needs to be processed by the network side device or not.

The relationship determining module 1 is configured to determine, under a condition of determining that the data to be processed needs to be processed by the network side device, whether the relationship between the processing delay correlation value of the data to be processed when processed by the network side device and the preset threshold value satisfies the preset relationship or not.

Figure 24:
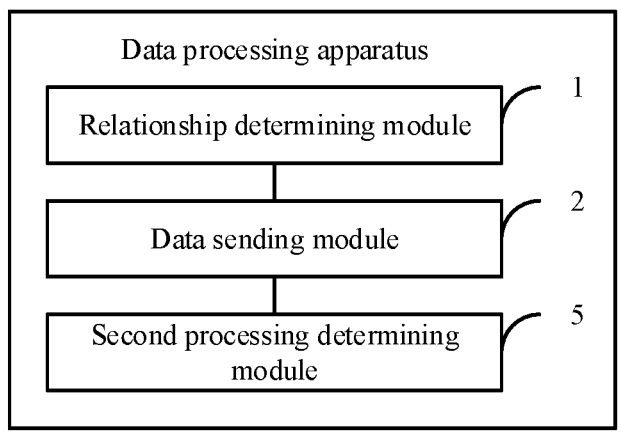
FIG. 24 is a schematic block diagram of yet another data processing apparatus illustrated according to an example of the disclosure.

FIG. 24 is a schematic block diagram of yet another data processing apparatus illustrated according to an example of the disclosure. As shown in FIG. 24, the apparatus further includes:

a second processing determining module 5, configured to determine, according to the state information of the terminal, whether the data to be processed needs to be processed by the network side device or not.

The data sending module 2 is configured to send, under a condition of determining that the data to be processed needs to be processed by the network side device, the data to be processed to the network side device for processing; the relationship determining module 1 is configured to determine, under a condition that the second processing determining module 5 cannot determine whether the data to be processed needs to be processed by the network side device or not according to the state information of the terminal, whether the relationship between the processing delay correlation value of the data to be processed when processed by the network side device and the preset threshold value satisfies the preset relationship or not.

Alternatively, the state information includes at least one of:

an electric quantity, and a load of a processor.

Figure 25:
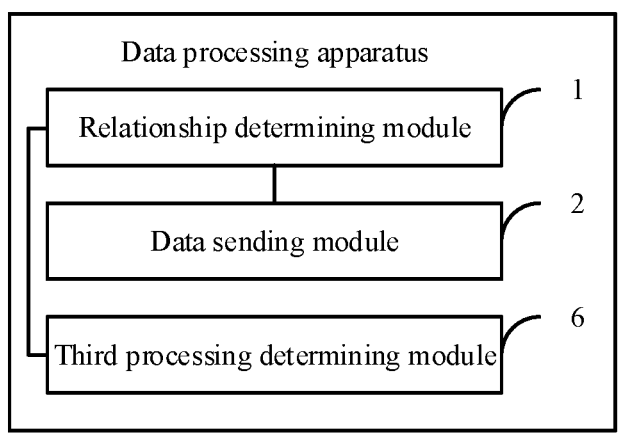
FIG. 25 is a schematic block diagram of yet another data processing apparatus illustrated according to an example of the disclosure.

FIG. 25 is a schematic block diagram of yet another data processing apparatus illustrated according to an example of the disclosure. As shown in FIG. 25, the apparatus further includes:

a third processing determining module 6, configured to determine, according to attribute information of the data to be processed, whether the data to be processed needs to be processed by the network side device or not.

The relationship determining module 1 is configured to determine, under a condition of determining that the data to be processed needs to be processed by the network side device, whether the relationship between the processing delay correlation value of the data to be processed when processed by the network side device and the preset threshold value satisfies the preset relationship or not.

Figure 26:
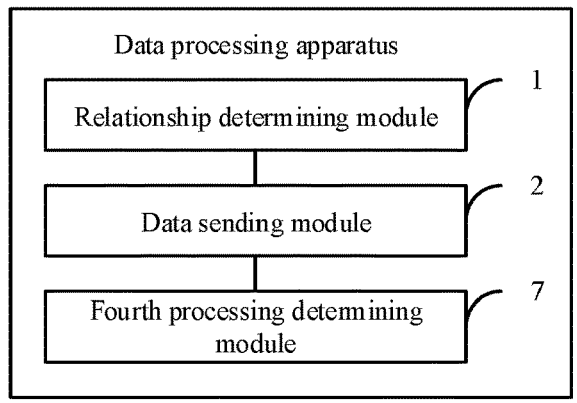
FIG. 26 is a schematic block diagram of yet another data processing apparatus illustrated according to an example of the disclosure.

FIG. 26 is a schematic block diagram of yet another data processing apparatus illustrated according to an example of the disclosure. As shown in FIG. 26, the apparatus further includes:

a fourth processing determining module 7, configured to determine, according to the attribute information of the data to be processed, whether the data to be processed needs to be processed by the network side device or not.

The data sending module 2 is configured to send, under a condition of determining that the data to be processed needs to be processed by the network side device, the data to be processed to the network side device for processing; and the relationship determining module 1 is configured to determine, under a condition that the fourth processing determining module 7 cannot determine whether the data to be processed needs to be processed by the network side device or not according to the attribute information of the data to be processed, whether the relationship between the processing delay correlation value of the data to be processed when processed by the network side device and the preset threshold value satisfies the preset relationship or not.

Alternatively, the attribute information includes at least one of:

the data size, and the data type.

Figure 27:
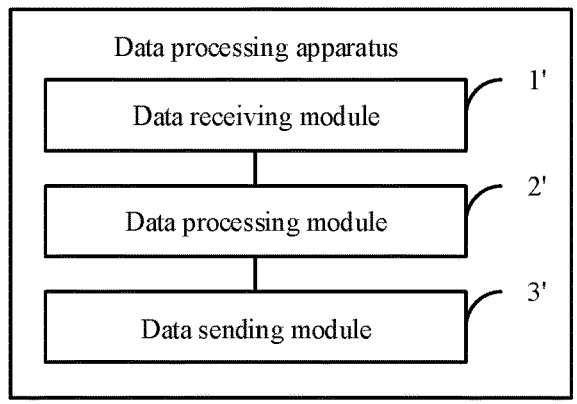
FIG. 27 is a schematic block diagram of a data processing apparatus illustrated according to an example of the disclosure.

FIG. 27 is a schematic block diagram of a data processing apparatus illustrated according to an example of the disclosure. The data processing apparatus illustrated by the example may be applicable to a network side device. The network side device may communicates with a terminal. The terminal serves as an user equipment. For instance, it may communicates with the terminal based on 4G or 5G. The terminal may be a cellphone, a tablet computer, a wearable device or other electronic devices.

As shown in FIG. 27, the data processing apparatus may include:

a data receiving module 1', configured to receive data to be processed sent by the terminal;

a data processing module 2', configured to process the data to be processed; and a data sending module 3', configured to send processed data to the terminal.

Figure 28:
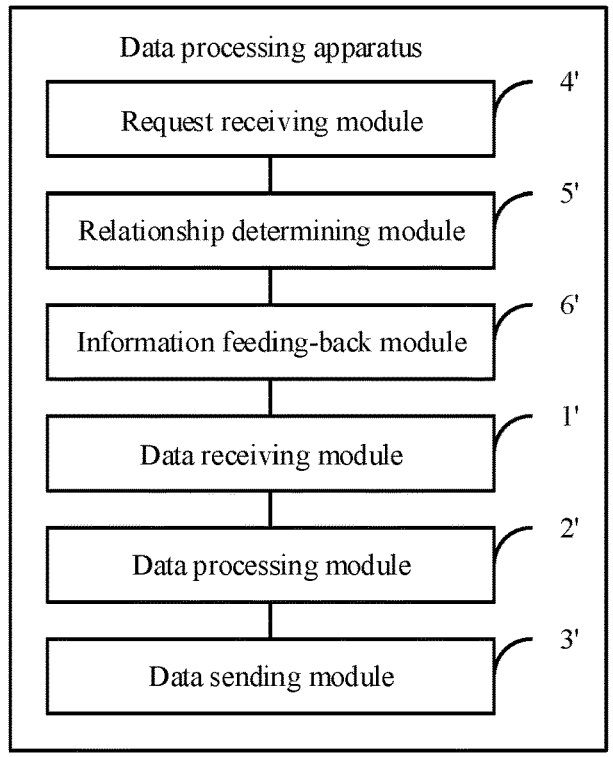
FIG. 28 is a schematic block diagram of another data processing apparatus illustrated according to an example of the disclosure.

FIG. 28 is a schematic block diagram of another data processing apparatus illustrated according to an example of the disclosure. As shown in FIG. 28, the apparatus further includes:

a request receiving module 4', configured to receive a data size of the data to be processed, a preset threshold value and a request for determining whether a relationship between a processing delay correlation value and the preset threshold value satisfies a preset relationship or not sent by the terminal;

a relationship determining module 5', configured to determine whether the relationship between the processing delay correlation value and the preset threshold value satisfies the preset relationship or not; and an information feeding-back module 6', configured to send feedback information to the terminal. The feedback information is used for indicating whether the relationship between the processing delay correlation value and the preset threshold satisfies the preset relationship or not.

Alternatively, the processing delay correlation value is a processing delay, the preset threshold value is a preset delay, and the relationship determining module is configured to determine whether the processing delay is smaller than the preset delay or not.

Figure 29:
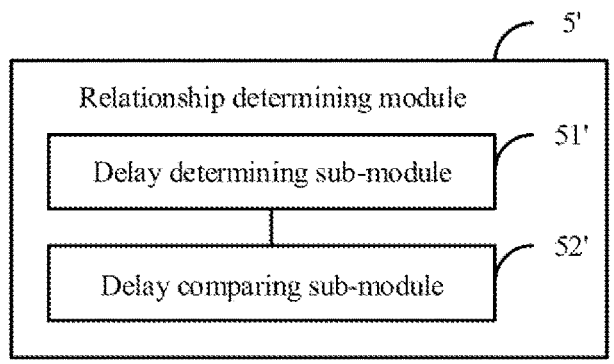
FIG. 29 is a schematic block diagram of a relationship determining module illustrated according to an example of the disclosure.

FIG. 29 is a schematic block diagram of a relationship determining module illustrated according to an example of the disclosure. As shown in FIG. 29, the relationship determining module 5' includes:

a delay determining sub-module 51', configured to determining a first delay in sending, by the terminal, the data to be processed to the network side device, a second delay in processing the data to be processed, and a third delay in sending the processed data to the terminal; and a delay comparing sub-module 52', configured to determine whether a sum of the first delay, the second delay and the third delay is smaller than the preset delay or not.

Alternatively, the processing delay correlation value is a processing speed, the preset threshold value is a preset speed, and the relationship determining module is configured to determine whether the processing speed is greater than the preset speed or not.

Figure 30:
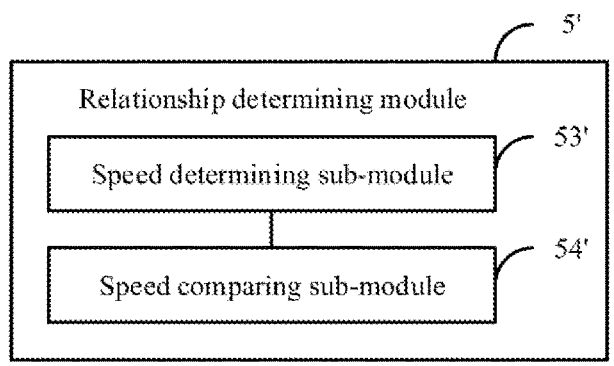
FIG. 30 is a schematic block diagram of another relationship determining module illustrated according to an example of the disclosure.

FIG. 30 is a schematic block diagram of another relationship determining module illustrated according to an example of the disclosure. As shown in FIG. 30, the relationship determining module 5' includes:

a speed determining sub-module 53', configured to determine a first speed of sending the data to be processed to the network side device, a second speed of processing, by the network side device, the data to be processed, and a third speed of receiving data obtained after processing the data to be processed from the network side device; and a speed comparing sub-module 54', determining whether a mean value of the first speed, the second speed and the third speed is greater than the preset speed or not.

Alternatively, the network side device includes at least one of:

a base station, and a core network.

With regard to the apparatus in the above example, specific modes of the modules in executing operations have been described in detail in the examples of the relevant methods, and no detailed description is made here.

With regard to the apparatus examples, because they basically correspond to the method examples, for correlated parts, reference may be made to the part of description in the method examples. The apparatus examples described above are merely illustrative. The modules described as separate components may or may not be physically separated, and components displayed as modules may or may not be physical modules, that is, they may be located in one place, or they may be distributed to a plurality of network modules. Some or all of the modules may be selected according to actual needs to achieve the objectives of the solutions of the examples. Those of ordinary skill in the art can understand and implement without creative work.

An example of the disclosure further provides an electronic device, including:

a processor; and a memory used for storing an instruction executable by the processor.

The processor is configured to realize the data processing method applicable to a terminal according to any one of the above examples.

An example of the disclosure further provides an electronic device, including:

a processor; and a memory used for storing an instruction executable by the processor.

The processor is configured to realize the data processing method applicable to a network side device according to any one of the above examples.

An example of the disclosure further provides a non-transitory computer-readable storage medium, storing a computer program on it. The program, when being executed by a processor, realizes steps in the data processing method applicable to a terminal according to any one of the above examples.

An example of the disclosure further provides a non-transitory computer-readable storage medium, storing a computer program on it. The program, when being executed by a processor, realizes steps in the data processing method applicable to a network side device according to any one of the above examples.

Figure 31:
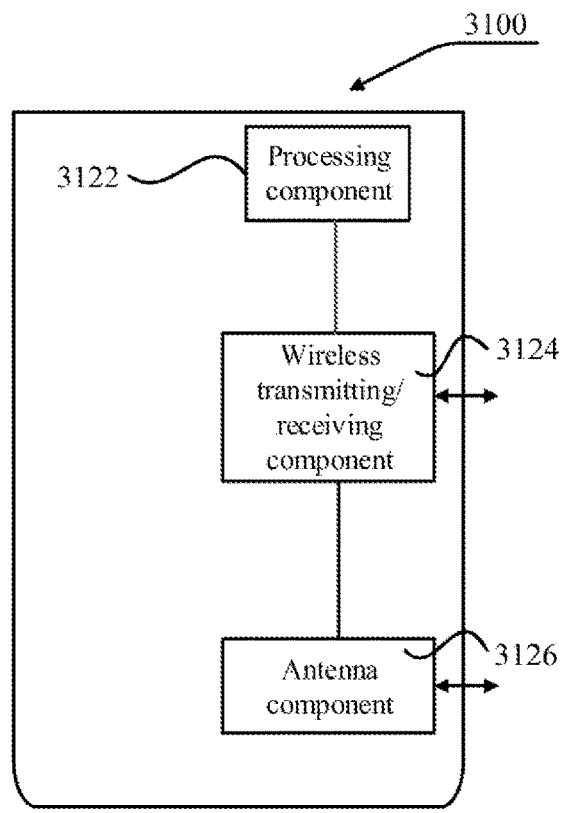
FIG. 31 is a schematic block diagram of an apparatus for data processing illustrated according to an example of the disclosure.

As shown in FIG. 31, FIG. 31 is a schematic block diagram of an apparatus 3100 for data processing illustrated according to an example of the disclosure. The apparatus 3100 may be provided as a network side device. With reference to FIG. 31, the apparatus 3100 includes a processing component 3122, a wireless transmitting/receiving component 3124, an antenna component 3126, and a signal processing part specific to a wireless interface. The processing component 3122 may further include one or a plurality of processors. One of the processors in the processing component 3122 may be configured to realize the data processing method applicable to a network side device according to any one of the above examples.

Figure 32:
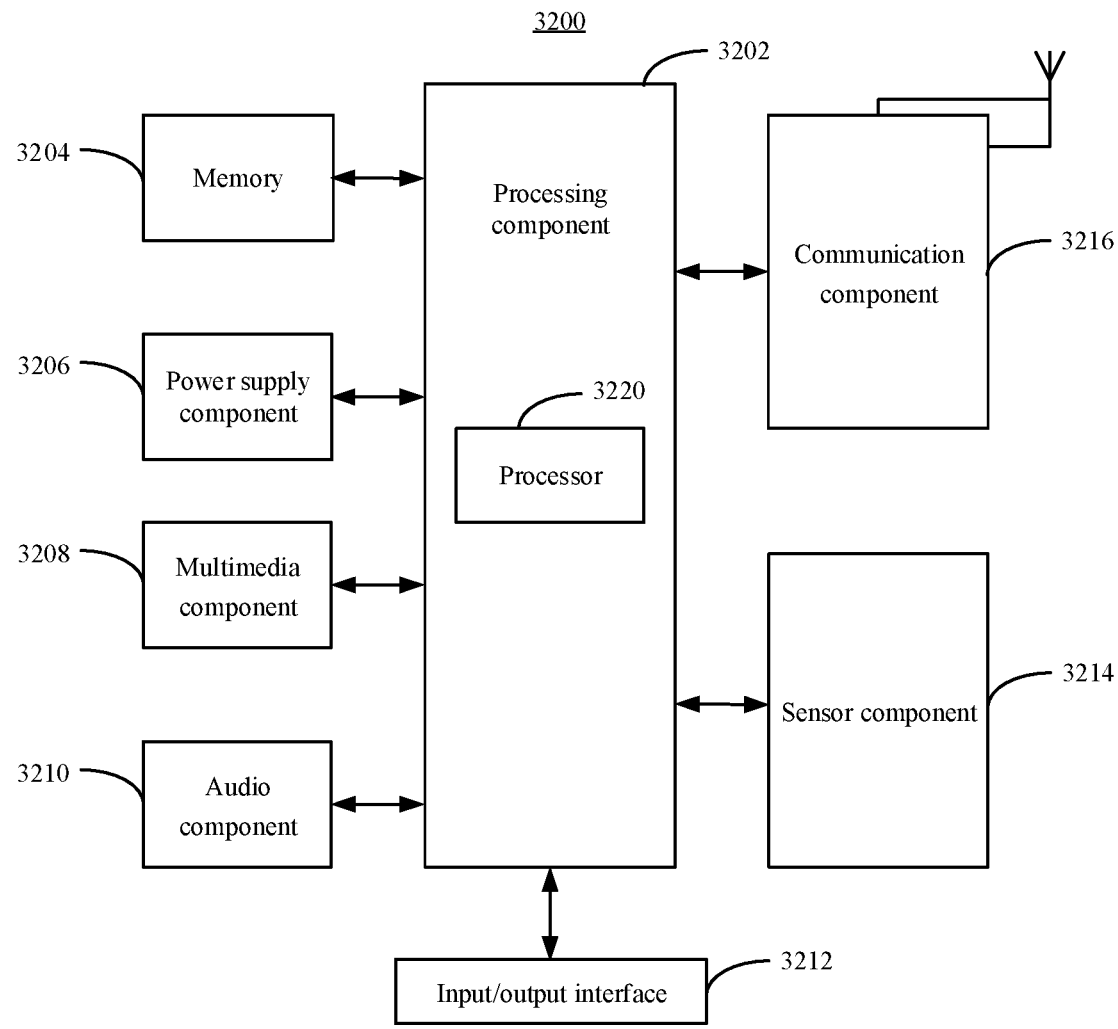
FIG. 32 is a schematic block diagram of an apparatus for data processing illustrated according to an example of the disclosure.

FIG. 32 is a schematic block diagram of an apparatus 3200 for data processing illustrated according to an example of the disclosure. For instance, the apparatus 3200 may be a mobile phone, a computer, a digital broadcasting terminal, a messaging device, a game console, a tablet device, a medical device, a fitness device, a personal digital assistant, etc.

With reference to FIG. 32, the apparatus 3200 may include one or more of: a processing component 3202, a memory 3204, a power supply component 3206, a multimedia component 3208, an audio component 3210, an input/output (I/O) interface 3212, a sensor component 3214, and a communication component 3216.

The processing component 3202 generally controls overall operations of the apparatus 3200, such as operations associated with display, telephone calls, data communication, camera operations, and recording operations. The processing component 3202 may include one or a plurality of processors 3220 to execute instructions to complete all or part of steps of the above method. In addition, the processing component 3202 may include one or a plurality of modules to facilitate interaction between the processing component 3202 and other components. For example, the processing component 3202 may include a multimedia module to facilitate interaction between the multimedia component 3208 and the processing component 3202.

The memory 3204 is configured to store various types of data to support operations on the apparatus 3200. Instances of these data include instructions for any application program or method operating on the apparatus 3200, contact data, phone book data, messages, pictures, videos, etc. The memory 3204 may be implemented by any type of volatile or non-volatile storage devices or their combination, such as a static random access memory (SRAM), an electrically erasable programmable read-only memory (EEPROM), an erasable Programmable read-only memory (EPROM), a programmable read-only memory (PROM), a read-only memory (ROM), a magnetic memory, a flash memory, a magnetic disk or an optical disk.

The power supply component 3206 provides power to various components of the apparatus 3200. The power supply component 3206 may include a power management system, one or a plurality of power supplies, and other components associated with generation, management, and distribution of the power for the apparatus 3200.

The multimedia component 3208 includes a screen that provides an output interface between the apparatus 3200 and a user. In some examples, the screen may include a liquid crystal display (LCD) and a touch panel (TP). If the screen includes the touch panel, the screen may be implemented as a touch screen to receive input signals from the user. The touch panel includes one or a plurality of touch sensors to sense touch, wipe, and gestures on the touch panel. The touch sensor may not only sense a boundary of a touch or wipe action, but also detect a duration and pressure related to a touch or wipe operation. In some examples, the multimedia component 3208 includes a front camera and/or a rear camera. When the apparatus 3200 is in an operation mode, such as a shooting mode or a video mode, the front camera and/or the rear camera may receive external multimedia data. Each front camera and rear camera may be a fixed optical lens system or have focal length and optical zoom capabilities.

The audio component 3210 is configured to output and/or input audio signals. For instance, the audio component 3210 includes a microphone (MIC). When the apparatus 3200 is in the operation mode, such as a call mode, a recording mode, and a voice recognition mode, the microphone is configured to receive external audio signals. The received audio signal may be further stored in the memory 3204 or sent via the communication component 3216. In some examples, the audio component 3210 further includes a speaker for outputting audio signals.

The I/O interface 3212 provides an interface between the processing component 3202 and a peripheral interface module. The above peripheral interface module may be a keyboard, a click wheel, buttons, etc. These buttons may include but are not limited to: a home button, a volume button, a start button, and a lock button.

The sensor component 3214 includes one or a plurality of sensors to provide the apparatus 3200 with various aspects of status assessment. For instance, the sensor component 3214 may detect an on/off status of the apparatus 3200 and relative positioning of a component. For instance, the component is a display and a keypad of the apparatus 3200. The sensor component 3214 may also detect a position change of the apparatus 3200 or a component of the apparatus 3200, presence or absence of contact between the user and the apparatus 3200, orientation or acceleration/deceleration of the apparatus 3200, and a temperature change of the apparatus 3200. The sensor component 3214 may include a proximity sensor configured to detect presence of a nearby object when there is no physical contact. The sensor component 3214 may also include a light sensor, such as a CMOS or CCD image sensor, for use in imaging applications. In some examples, the sensor component 3214 may also include an acceleration sensor, a gyroscope sensor, a magnetic sensor, a pressure sensor or a temperature sensor.

The communication component 3216 is configured to facilitate wired or wireless communication between the apparatus 3200 and other devices. The apparatus 3200 may access a wireless network based on a communication standard, such as WiFi, 2G or 3G, 4G LTE, 5G NR, or a combination of them. In an illustrative example, the communication component 3216 receives a broadcast signal or broadcast related information from an external broadcast management system via a broadcast channel. In an illustrative example, the communication component 3216 further includes a near field communication (NFC) module to facilitate short-range communication. For instance, the NFC module may be implemented based on radio frequency identification (RFID) technology, infrared data association (IrDA) technology, ultra-wideband (UWB) technology, Bluetooth (BT) technology and other technologies.

In an illustrative example, the apparatus 3200 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor, or other electronic components, so as to execute the data processing method applicable to a terminal described in any one of the above examples.

In an illustrative example, a non-transitory computer-readable storage medium including instructions is further provided, for instance, a memory 3204 including the instructions. The above instructions may be executed by a processor 3220 of an apparatus 3200 to complete the above method. For instance, the non-transitory computer-readable storage medium may be a ROM, a random access memory (RAM), a CD-ROM, a magnetic tape, a floppy disk, an optical data storage device, etc.

According to the examples of the disclosure, under a condition that the relationship between the processing delay correlation value and the preset threshold value satisfies the preset relationship, for instance, the processing delay is smaller than a preset duration, or the processing speed is greater than the preset speed, it may be determined that a delay caused by subjecting the data to be processed to processing by the network side device is relatively low, which may easily meet a user's requirement for a low delay, so the data to be processed may be sent to the network side device for processing. The network side device may include the base station, the core network, etc.

Accordingly, under a condition that the delay caused by subjecting the data to be processed to processing by the network side device is relatively low, the data to be processed may be sent to the network side device for processing, so as to lower a size of data processed by the terminal, reduce a load of the terminal, and enhance an effect achieved by the network side device in a process of communicating with the terminal.

After considering the specification and practicing the disclosure disclosed herein, those of skill in the art will easily think of other examples of the disclosure. The disclosure is intended to cover any variations, uses, or adaptive changes of the disclosure. These variations, uses, or adaptive changes follow the general principles of the disclosure and include common knowledge or conventional technical means in the technical field that are not disclosed in the disclosure. The specification and the examples are to be regarded as illustrative, and the true scope and spirit of the disclosure are pointed out by the appended claims.

It should be understood that the disclosure is not limited to the precise structure that has been described above and shown in the drawings, and various modifications and changes can be made without departing from its scope. The scope of the present disclosure is limited by the appended claims.

It should be noted that, relational terms herein such as first and second are used to distinguish one entity or operation from another entity or operation, and do not necessarily require or imply any such actual relationship or sequence between these entities or operations. The terms "include", "comprise" or any other variants of them are intended to cover non-exclusive inclusion, so that a process, method, article or device including a series of elements not only includes those elements, but also includes other elements that are not explicitly listed, or also includes elements inherent to such process, method, article or device. If there are no more restrictions, the element defined by the sentence "including a . . . " does not exclude the existence of other identical elements in the process, method, article or device that includes the element.

The methods and apparatuses provided by the examples of the disclosure are described in detail above. Specific instances are used herein to illustrate the principles and implementations of the disclosure. The descriptions of the above examples are used to facilitate understanding of the methods of the disclosure and core ideas of them. At the same time, for those of ordinary skill in the art, based on the ideas of the disclosure, there will be changes in the specific implementations and the scope of application. In summary, the content of this specification should not be construed as restrictions to the disclosure.

What is claimed is:

1. A data processing method, comprising:
   determining, by a terminal, whether a relationship between a processing delay correlation value of data to be processed when processed by a network side device and a preset threshold value satisfies a preset relationship or not;
   sending, by the terminal and in response to determining that the relationship between the processing delay correlation value and the preset threshold value satisfies the preset relationship, the data to be processed to the network side device for processing to reduce a data size of data processed by the terminal and a load of the terminal; and
   processing, by the terminal and in response to determining that the relationship between the processing delay correlation value and the preset threshold value does not satisfy the preset relationship, the data to be processed.

2. The method according to claim 1, wherein the processing delay correlation value is a processing delay, the preset threshold value is a preset delay, and determining whether the relationship between the processing delay correlation value of the data to be processed when processed by the network side device and the preset threshold value satisfies the preset relationship or not comprises:
   determining whether the processing delay is smaller than the preset delay or not.

3. The method according to claim 2, wherein determining whether the processing delay is smaller than the preset delay or not comprises:
   determining a first delay in sending the data to be processed to the network side device, a second delay in processing, by the network side device, the data to be processed, and a third delay in receiving data obtained after processing the data to be processed from the network side device; and
   determining whether a sum of the first delay, the second delay and the third delay is smaller than the preset delay or not.

4. The method according to claim 1, wherein the processing delay correlation value is a processing speed, the preset threshold value is a preset speed, and determining whether the relationship between the processing delay correlation value of the data to be processed when processed by the network side device and the preset threshold value satisfies the preset relationship or not comprises:
   determining whether the processing speed is greater than the preset speed or not.

5. The method according to claim 4, wherein determining whether the processing speed is greater than the preset speed or not comprises:
   determining a first speed of sending the data to be processed to the network side device, a second speed of processing, by the network side device, the data to be processed, and a third speed of receiving data obtained after processing the data to be processed from the network side device; and
   determining whether a mean value of the first speed, the second speed and the third speed is greater than the preset speed or not.

6. The method according to claim 1, wherein determining whether the relationship between the processing delay correlation value of the data to be processed when processed by the network side device and the preset threshold value satisfies the preset relationship or not comprises:
   sending, to the network side device, a data size of the data to be processed, the preset threshold value and a request for determining whether the relationship between the processing delay correlation value and the preset threshold value satisfies the preset relationship or not; and
   determining, according to feedback information of the network side device, whether the relationship between the processing delay correlation value and the preset threshold value satisfies the preset relationship or not.

7. The method according to claim 1, further comprising:
   receiving, by the terminal, data after the network side device processes the data to be processed.

8. The method according to claim 1, wherein before determining whether the relationship between the processing delay correlation value of the data to be processed when processed by the network side device and the preset threshold value satisfies the preset relationship or not, the method further comprises:
   determining, by the terminal and according to state information of the terminal or attribute information of the data to be processed, whether the data to be processed needs to be processed by the network side device or not; and
   in response to determining that the data to be processed needs to be processed by the network side device, determining whether the relationship between the processing delay correlation value of the data to be processed when processed by the network side device and the preset threshold value satisfies the preset relationship or not, or sending the data to be processed to the network side device for processing;

determining, in response to determining that it cannot be determined whether the data to be processed needs to be processed by the network side device or not, whether the relationship between the processing delay correlation value of the data to be processed when processed by the network side device and the preset threshold value satisfies the preset relationship or not.

9. The method according to claim 8, wherein the state information comprises at least one of following parameters:
an electric quantity, or a load of a processor;
or, wherein the attribute information comprises at least one of following parameters:
a data size, or a data type.

10. A data processing method, comprising:
receiving, by a network side device, a data size of data to be processed, a preset threshold value and a request for determining whether a relationship between a processing delay correlation value and the preset threshold value satisfies a preset relationship or not sent by a terminal;
determining, by the network side device, whether the relationship between the processing delay correlation value and the preset threshold satisfies the preset relationship or not;
sending, by the network side device, feedback information to the terminal, wherein the feedback information indicates whether the relationship between the processing delay correlation value and the preset threshold satisfies the preset relationship or not;
receiving, by the network side device, the data to be processed sent by the terminal, wherein the terminal sends the data to be processed to the network side device in response to determining that the relationship between the processing delay correlation value and the preset threshold value satisfies the preset relationship, and processes the data to be processed in response to determining that the relationship between the processing delay correlation value and the preset threshold value does not satisfy the preset relationship;
processing, by the network side device, the data to be processed; and
sending, by the network side device, processed data to the terminal to reduce a data size of data processed by the terminal and a load of the terminal.

11. The method according to claim 10, wherein the processing delay correlation value is a processing delay, the preset threshold value is a preset delay, and determining whether the relationship between the processing delay correlation value of the data to be processed when processed by the network side device and the preset threshold value satisfies the preset relationship or not comprises:
determining whether the processing delay is smaller than the preset delay or not.

12. The method according to claim 11, wherein determining whether the processing delay is smaller than the preset delay or not comprises:
determining a first delay in sending, by the terminal, the data to be processed to the network side device, a second delay in processing the data to be processed, and a third delay in sending the processed data to the terminal; and determining whether a sum of the first delay, the second delay and the third delay is smaller than the preset delay or not.

13. The method according to claim 10, wherein the processing delay correlation value is a processing speed, the preset threshold value is a preset speed, and determining whether the relationship between the processing delay correlation value of the data to be processed when processed by the network side device and the preset threshold value satisfies the preset relationship or not comprises:
determining whether the processing speed is greater than the preset speed or not.

14. The method according to claim 13, wherein determining whether the processing speed is greater than the preset speed or not comprises:
determining a first speed of sending the data to be processed to the network side device, a second speed of processing, by the network side device, the data to be processed, and a third speed of receiving data obtained after processing the data to be processed from the network side device; and
determining whether a mean value of the first speed, the second speed and the third speed is greater than the preset speed or not.

15. The method according to claim 10, wherein the network side device comprises a base station or a core network.

16. An electronic device, comprising:
a processor; and
a memory used for storing an instruction executable by the processor; wherein
the processor is configured to:
determine whether a relationship between a processing delay correlation value of data to be processed when processed by a network side device and a preset threshold value satisfies a preset relationship or not;
send, in response to determining that the relationship between the processing delay correlation value and the preset threshold value satisfies the preset relationship, the data to be processed to the network side device for processing to reduce a data size of data processed by the terminal and a load of the terminal; and
process, in response to determining that the relationship between the processing delay correlation value and the preset threshold value does not satisfy the preset relationship, the data to be processed.

17. An electronic device, comprising:
a processor; and
a memory used for storing an instruction executable by the processor; wherein
the processor is configured to realize the data processing method applicable to a network side device according to claim 10.

18. A non-transitory computer-readable storage medium, storing a computer program thereon, wherein the program, when being executed by a processor, realizes steps in the data processing method applicable to a terminal according to claim 1.

19. A non-transitory computer-readable storage medium, storing a computer program thereon, wherein the program, when being executed by a processor, realizes steps in the data processing method applicable to a network side device according to claim 10.

* * * * *